United States Patent
Ozawa et al.

(10) Patent No.: US 7,404,850 B2
(45) Date of Patent: *Jul. 29, 2008

(54) INK STOCK SOLUTION AND INK COMPOSITION

(75) Inventors: Takashi Ozawa, Fuzinomiya (JP); Yoshiharu Yabuki, Minami-Ashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/372,114

(22) Filed: Mar. 10, 2006

(65) Prior Publication Data

US 2006/0201382 A1    Sep. 14, 2006

(30) Foreign Application Priority Data

Mar. 11, 2005    (JP)    ............ P.2005-069772

(51) Int. Cl.
*C09D 11/00* (2006.01)
*C09D 11/02* (2006.01)

(52) U.S. Cl. .......... 106/31.27; 106/31.49; 106/31.6; 106/31.78

(58) Field of Classification Search ........... 106/31.27, 106/31.6, 31.49, 31.78
See application file for complete search history.

(56) References Cited

U.S. PATENT DOCUMENTS

| 7,052,535 | B2 * | 5/2006 | Uhlir-Tsang et al. | 106/31.27 |
| 7,052,537 | B2 * | 5/2006 | Uhlir-Tsang | 106/31.49 |
| 2002/0025412 | A1 * | 2/2002 | Hanmura et al. | 428/195 |
| 2004/0003755 | A1 * | 1/2004 | Fukumoto et al. | 106/31.58 |
| 2005/0025915 | A1 * | 2/2005 | Uhlir-Tsang et al. | 428/32.34 |
| 2005/0109236 | A1 | 5/2005 | Yabuki et al. | |
| 2005/0233097 | A1 * | 10/2005 | Tojo et al. | 428/32.36 |

FOREIGN PATENT DOCUMENTS

| EP | 1514913 | * | 3/2005 |
| JP | 8-100141 A | | 4/1996 |
| JP | 2003-321630 A | | 11/2003 |
| JP | 2004-75825 A | | 3/2004 |

OTHER PUBLICATIONS

Derwent Abstract of JP 08/100141, Apr. 1996.*

* cited by examiner

*Primary Examiner*—Helene Klemanski
(74) *Attorney, Agent, or Firm*—Sughrue Mion, PLLC

(57) ABSTRACT

An ink stock solution contains at least a dye and a colorless planar compound having more than ten delocalization π electrons in one molecule, and an ink composition is manufactured with the same ink stock solution.

10 Claims, No Drawings

INK STOCK SOLUTION AND INK COMPOSITION

BACKGROUND OF THE INVENTION

1. Field of the Invention

The present invention relates to an ink stock solution and an ink composition.

2. Background Art

With the spread of the computer in recent years, ink jet printers are widely used not only in offices but also in homes for printing on papers, films, cloths, etc.

As ink jet recording methods, a method of ejecting ink droplets by applying pressure by piezo-elements, a method of ejecting ink droplets by generating bubbles in ink composition by heat, a method of using ultrasonic waves, and a method of suction-ejecting ink droplets by electrostatic force. As the ink compositions for these ink jet recording methods, an aqueous ink, an oil ink composition and a solid ink composition (a melting type) are used. Of these ink compositions, aqueous ink composition is mainly used for easiness of manufacture and handling, odor and safety.

Colorants used in these ink compositions for ink jet recording are required to have high solubility in a solvent, to be capable of high density recording, to be good in hue, to be excellent in fastness to light, heat, air, ozone, water and chemicals, to have good fixing property to an image-receiving material and to hardly blot, to be excellent in preservation stability as ink composition, to be free of toxicity, to be high in purity, and to be available inexpensively. However, it is extremely difficult to search for colorants that satisfy these requirements on a high level.

Various dyes and pigments have been already proposed for ink jet recording and practically used but colorants that satisfy all of these requirements have not been discovered yet. It is difficult for dyes and pigments having Color Index Nos. (C.I.) to reconcile the hue and the fastness required of the ink compositions for ink jet recording.

The present inventors have proposed cyan dyes having excellent hue and fastness (refer to, e.g., JP-A-2003-321630 (The term "JP-A" as used herein refers to an "unexamined published Japanese patent application".) and JP-A-2004-75825).

In manufacturing an ink composition, e.g., an ink composition for ink jet recording, powders of dyes are generally used, but it is advantageous to manufacture an ink composition from a concentrated ink composition, that is, an ink stock solution considering handling property and solubility.

However, when a dye having a high oxidation potential is used in an ink stock solution for ink jet recording that is the feedstock of the ink composition for ink jet recording, the viscosity becomes extremely high, so that serious problems arise in handling properties at the time of feeding and filtering of the ink composition.

SUMMARY OF THE INVENTION

An object of the invention is to provide an ink stock solution excellent in handling property and an ink composition, preferably an ink composition for ink jet recording, using the ink stock solution.

The above object of the invention can be achieved by the following means.

(1) An ink stock solution comprising at least a dye and a colorless planar compound having more than ten delocalization π electrons in one molecule.

(2) The ink stock solution as described in the above item (1), wherein the dye is a compound represented by formula (C):

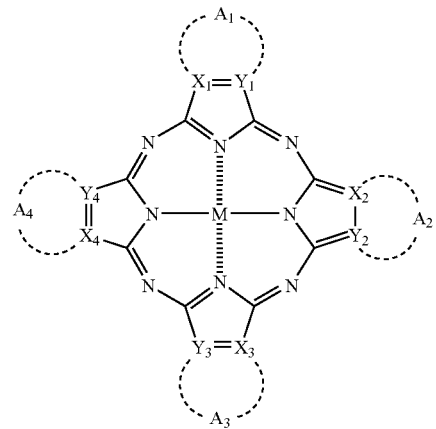

Formula (C)

wherein $X_1$, $X_2$, $X_3$, $X_4$, $Y_1$, $Y_2$, $Y_3$ and $Y_4$ each independently represents a carbon atom or a nitrogen atom; $A_1$ represents an atomic group necessary to form an aromatic ring or a heterocyclic ring together with $X_1$ to $X_4$ and $Y_1$ to $Y_4$, $A_2$ represents an atomic group necessary to form an aromatic ring or a heterocyclic ring together with $X_1$ to $X_4$ and $Y_1$ to $Y_4$, $A_3$ represents an atomic group necessary to form an aromatic ring or a heterocyclic ring together with $X_1$ to $X_4$ and $Y_1$ to $Y_4$, $A_4$ represents an atomic group necessary to form an aromatic ring or a heterocyclic ring together with $X_1$ to $X_4$ and $Y_1$ to $Y_4$, each of $A_1$ to $A_4$ may have a substituent, at least one of $A_1$ to $A_4$, or at least one of the substituents of $A_1$ to $A_4$ has a substituent for imparting solubility; and M represents a hydrogen atom, a metallic element, a metallic oxide, a metallic hydroxide, or a metal halide.

(3) The ink stock solution as described in the above item (2), wherein the compound represented by formula (C) is represented by formula (C-d):

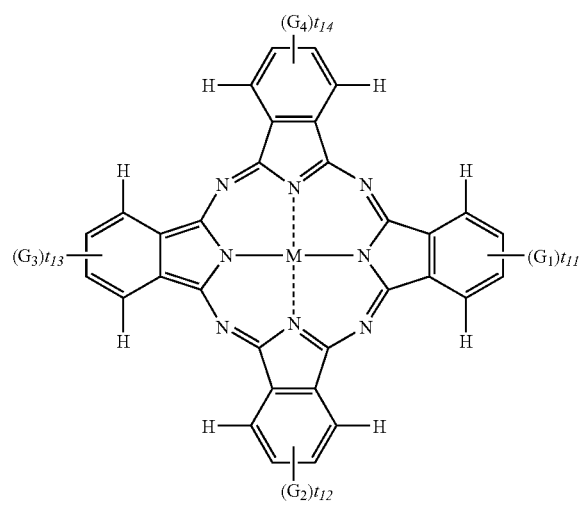

Formula (C-d)

wherein $G_1$ represents —SO-Z, —$SO_2$-Z, —$SO_2NV_1V_2$, —$CONV_1V_2$, —$CO_2Z$, —COZ, or a sulfo group, $G_2$ represents —SO-Z, —$SO_2$-Z, —$SO_2NV_1V_2$, —$CONV_1V_2$, —$CO_2Z$, —COZ, or a sulfo group, $G_3$ represents —SO-Z, —$SO_2$-Z, —$SO_2NV_1V_2$, —$CONV_1V_2$, —$CO_2Z$, —COZ, or a sulfo group, and $G_4$ represents —SO-Z, —$SO_2$-Z, —$SO_2NV_1V_2$, —$CONV_1V_2$, —$CO_2Z$, —COZ, or a sulfo group; Z, which is the same or different, each represents an alkyl group, a cycloalkyl group, an alkenyl group, an alkynyl group, an aralkyl group, an aryl group, or a heterocyclic group; $V_1$ and $V_2$, which is the same or different, each represents a hydrogen atom, an alkyl group, a cycloalkyl group, an alkenyl group, an alkynyl group, an aralkyl group, an aryl group, or a heterocyclic group; M has the same meaning as M in formula (C); and $t_{11}$, $t_{12}$, $t_{13}$ and $t_{14}$ each represents 1 or 2.

(4) The ink stock solution as described in the above item (1), wherein the planar compound is represented by formula (1):

$$A_{10}\text{-}X_{10}\text{-}L_{10}\text{-}(Y_{10}\text{—}B_{10})_n \tag{1}$$

wherein $A_{10}$, $L_{10}$, $B_{10}$ each independently represents an aromatic group, which is a monocyclic ring or a condensed ring; $X_{10}$ and $Y_{10}$ each independently represents a divalent linking group, that is, an alkylene group, an alkenylene group, —CO—, —$SO_m$—, —NR—, —O—, or a divalent group combining these linking groups; m represents 0, 1 or 2; R represents a hydrogen atom, an alkyl group, an aryl group, or a heterocyclic group; n represents 0 or 1; provided that the compound represented by formula (1) contains at least one ionic hydrophilic group selected from a sulfo group, a carboxyl group, a phenolic hydroxyl group, and a phosphono group.

(5) The ink stock solution as described in the above item (1), which has a concentration of the dye of 10 mass % or more.

(6) The ink stock solution as described in the above item (1), which has a content of the planar compound of from 0.1 to 10 mass %.

(7) The ink stock solution as described in the above item (1), which has a coefficient of viscosity of from 1 to 10 mPa·s.

(8) The ink stock solution as described in the above item (1), which contains an antiseptic.

(9) The ink stock solution as described in the above item (1), which contains a pH adjustor.

(10) An ink composition manufactured with the ink stock solution as described in the above item (1).

Since the ink stock solution in the invention contains a planar compound, the viscosity is maintained low, further, handling properties such as filtering process and carrying in the manufacturing processes of ink stock solution and ink composition are improved, and an ink composition, in particular an ink composition for ink jet recording, having stable quality can be manufactured.

Further, an ink stock solution in the invention can preferably use dyes having a high oxidation potential, so that excellent in ozone resistance and preservation stability.

Moreover, an ink stock solution in the invention can use solution of dyes before making powder in the manufacturing process of synthesis of a dye, so that the ink stock solution in the invention can contribute to the reduction of production costs of ink composition.

DETAILED DESCRIPTION OF THE INVENTION

An exemplary embodiment of an ink stock solution in the invention comprises at least a dye and a planar compound. In the invention, "an ink stock solution" means that the concentration of a dye is 7 mass % (In this specification, mass % and parts by mass are equal to weight % and parts by weight, respectively) or more. Dye concentration is preferably from 10 to 50 mass %, and especially preferably from 10 to 30 mass %.

A planar compound is explained below.

A planar compound is a colorless compound having more than ten delocalization π electrons in one molecule.

In general, when the number of π electrons constituting delocalized π electron system increases and π electron system broadens, the compound has absorption in a visible region in many cases. In the invention, "colorless" includes an extremely slightly colored state in the range that does not influence an image. A colorless compound may be a fluorescent compound, but a fluorescence-free compound is preferred, more preferably a compound having λmax of absorption peak of the longest wavelength side of 350 nm or less, and still more preferably a compound having the λmax of 320 nm or less and an molar extinction coefficient of 10,000 or less.

A planar compound has more than ten delocalization π electrons in one molecule.

The least upper bound of the number of π electrons is not especially restricted, but is preferably 80 or less, more preferably 50 or less, and especially preferably 30 or less. π electrons exceeding 10 may form one great delocalization system, or may form two or more delocalization systems. A compound having two or more aromatic rings in one molecule is especially preferred. The aromatic ring may be an aromatic hydrocarbon ring or may be an aromatic heterocyclic ring containing a hetero atom, or may be one aromatic ring formed by condensation. As the examples of the aromatic rings, benzene, naphthalene, anthracene, pyridine, pyrimidine, pyrazine and triazine are exemplified.

The total number of carbon atoms of a planar compound is preferably 180 or less, more preferably 120 or less, and especially preferably 80 or less.

A planar compound is preferably a compound capable of dissolving by 1 g or more in 100 g of water at 20° C., more preferably 5 g or more, and most preferably 10 g or more.

In the case of a compound having two or more aromatic rings in one molecule, it is especially preferred to have at least two soluble groups bonded to the aromatic rings in the molecule. The examples of useful soluble groups include a sulfo group, a carboxyl group, a hydroxyl group, a phosphono group, a carbonamido group, a sulfonamido group, a quaternary ammonium salt, and other groups well known in the industry, but soluble groups are not restricted to these groups. Of the above groups, a sulfo group and a carboxyl group are preferred, and a sulfo group is most preferred.

That which limits the upper limit number of the soluble groups in a molecule is the number of the positions of usable substitutions alone, however, for practical purpose, it is sufficient that the same or different ten soluble groups are present in a molecule. The counter cations of these soluble groups are not restricted and, e.g., alkali metal, ammonium, and organic cations (tetramethylammonium, guanidinium, pyridinium, etc.) are exemplified. Alkali metal and ammonium are preferred of them, lithium, sodium and ammonium are particularly preferred, and lithium and ammonium are most preferred.

As the specific examples, the compounds disclosed in the following patent are exemplified: JP-A-63-55544, JP-A-3-146947, JP-A-3-149543, JP-A-2001-201831, JP-A-2002-139822, JP-A-2002-196460, JP-A-2002-244257, JP-A-

2002-244259, JP-A-2002-296743, JP-A-2002-296744, JP-A-2003-307823, JP-A-2003-255502, and JP-A-2004-4500.

Above all, the compound represented by the following formula (1) is preferably used.

$$A_{10}\text{-}X_{10}\text{-}L_{10}\text{-}(Y_{10}\text{—}B_{10})_n \qquad (1)$$

In formula (1), $A_{10}$, $L_{10}$, $B_{10}$ each independently represents an aromatic group (including an aryl group and an aromatic heterocyclic group), which may be a monocyclic ring or a condensed ring; $X_{10}$ and $Y_{10}$ each represents a divalent linking group, that is, an alkylene group, an alkenylene group, —CO—, —SO$_m$—, —NR—, —O—, or a divalent group combining these linking groups; m represents 0, 1 or 2; R represents a hydrogen atom, an alkyl group, an aryl group, or a heterocyclic group; the divalent linking group is preferably —NH—; n represents 0 or 1; provided that the compound represented by formula (1) contains at least one ionic hydrophilic group selected from a sulfo group, a carboxyl group, a phenolic hydroxyl group, and a phosphono group. These ionic hydrophilic groups may take the form of a salt, and the counter cations are not restricted and, e.g., alkali metal, ammonium, organic cations (tetramethylammonium, guanidinium, pyridinium, etc.) can be exemplified. Alkali metal and ammonium are preferred of them, lithium, sodium and ammonium are especially preferred, and lithium and ammonium are most preferred.

The compound represented by formula (1) may have a substituent other than ionic hydrophilic groups, specifically an alkyl group, an aryl group, an aralkyl group, a heterocyclic group, an alkoxyl group, an aryloxy group, a hydroxyl group, an amino group (including an anilino group and a heterocyclic amino group), an acyl group, an acylamino group, a ureido group, a halogen atom, a sulfamoyl group, a carbamoyl group, a sulfonamido group, a sulfonyl group, a sulfenyl group, and a sulfinyl group can be exemplified as the substituents. These substituents may further have a substituent. Of the compounds represented by formula (1), preferred compounds are those wherein n is 1, and at least one of $A_{10}$, $L_{10}$ and $B_{10}$ is an aromatic heterocyclic ring, and compounds containing from 2 to 4 ionic hydrophilic group are preferred.

Although it is not clearly known that what a functional mechanism of a planar compound suppresses the increase of the viscosity of an ink stock solution, it is presumably due to the fact that a planar compound functions as a deagglomerating agent to deagglomerate by working stronger mutual action of π electrons on the dye agglomerated (aggregated) by the mutual action of π electrons among the dye molecules, as a result, the reduction of viscosity is accelerated. Further, it is important that a deagglomerating agent is planar and π electron system is widely spread in order to enter into among the agglomerated dyes or to work on π electrons to exhibit strong mutual action to the dyes on the surface of dye aggregates. It is also important that a deagglomerating agent has sufficient solubility so that the complex formed by the deagglomerating agent itself or the deagglomerating agent and the dye does not precipitate. The necessary number of π electrons varies according to the size of the dye to be used, so that the number is arbitrarily selected according to the size of the dye.

As the examples of the compounds preferably used in the invention, the compounds disclosed in JP-A-2002-139822, JP-A-2002-196460, JP-A-2002-244257, JP-A-2002-244259, JP-A-2002-296743, JP-A-2002-296744, and JP-A-2003-307823 are exemplified. The examples of representative planar compounds are shown below.

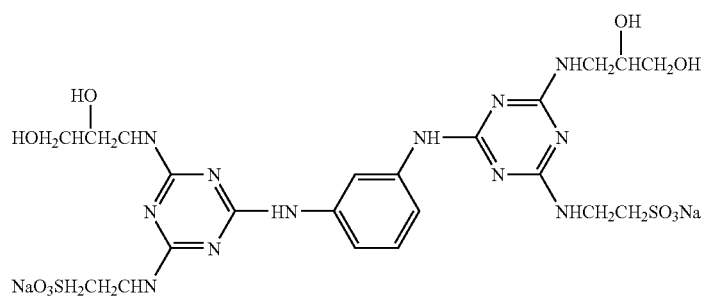

P-1

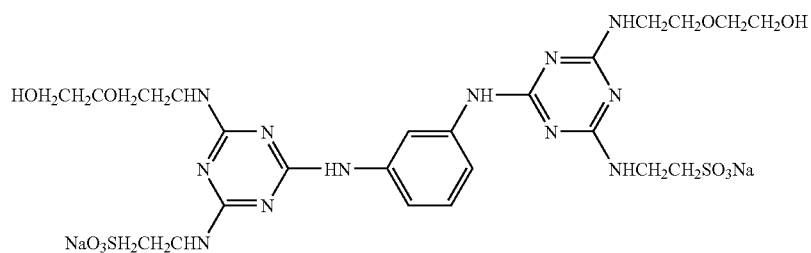

P-2

-continued
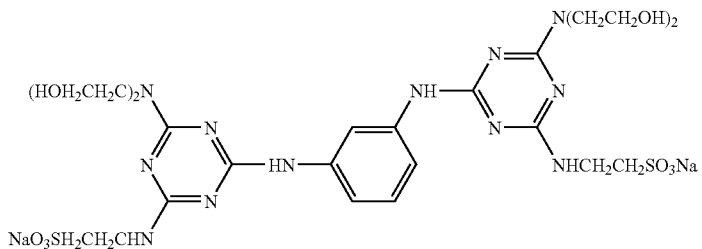
P-3
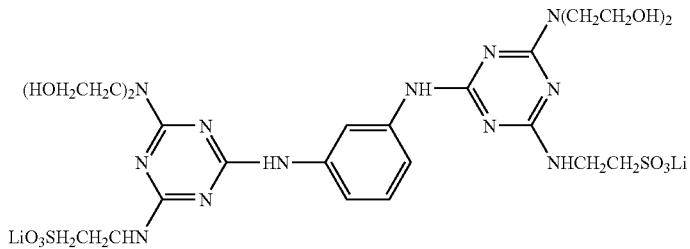
P-4
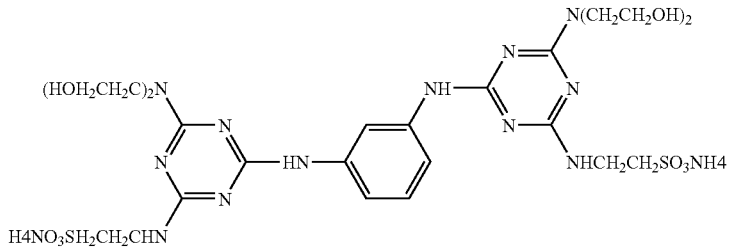
P-5
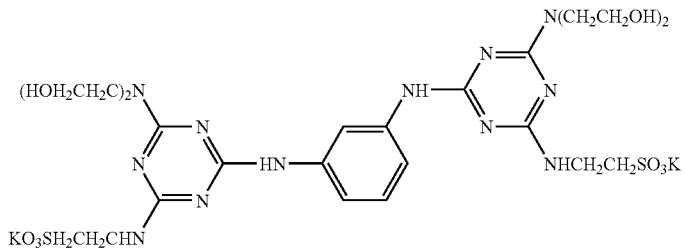
P-6
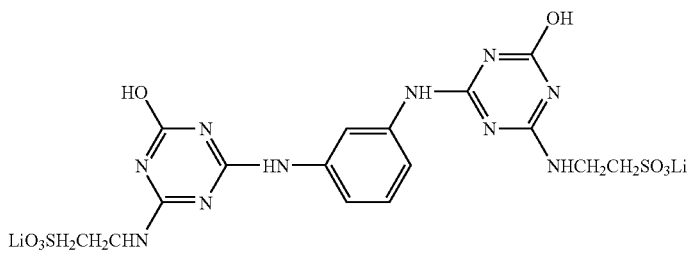
P-7
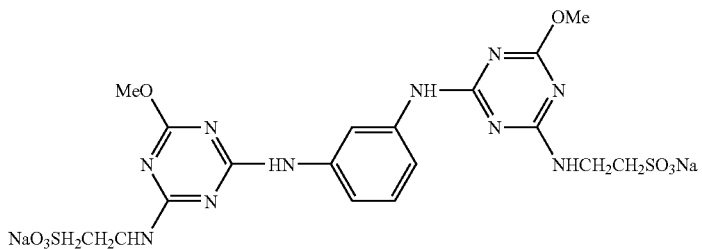
P-8

-continued
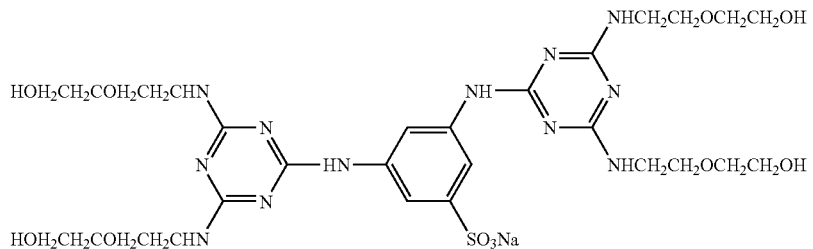
P-9
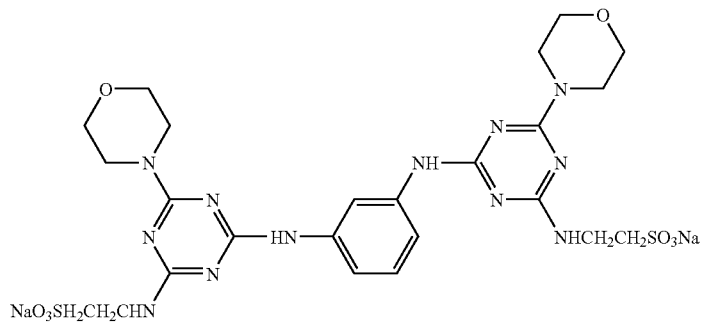
P-10
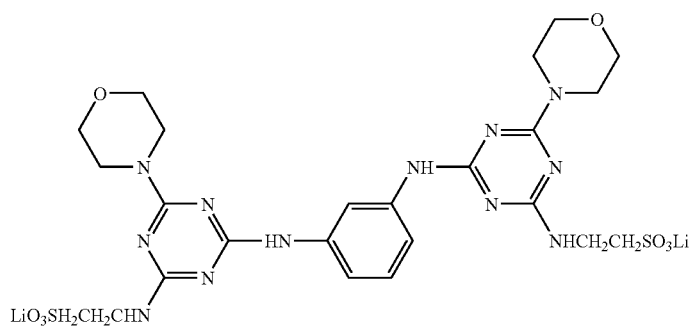
P-11
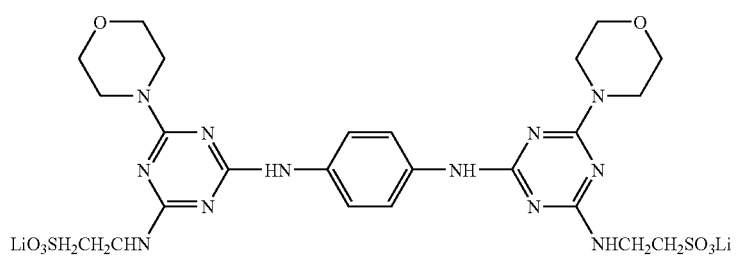
P-12
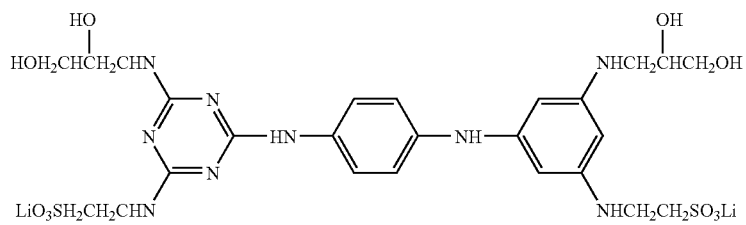
P-13
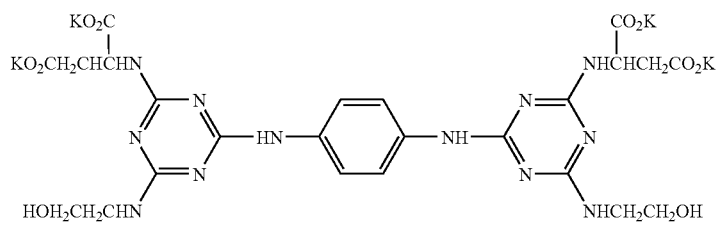
P-14

-continued
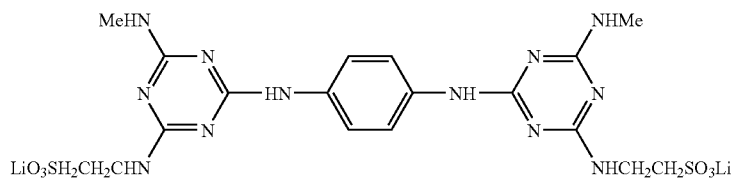
P-15
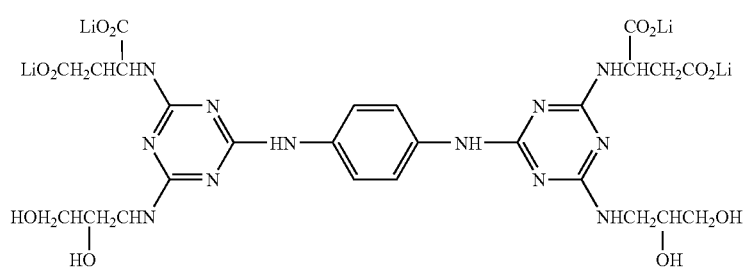
P-16
P-17
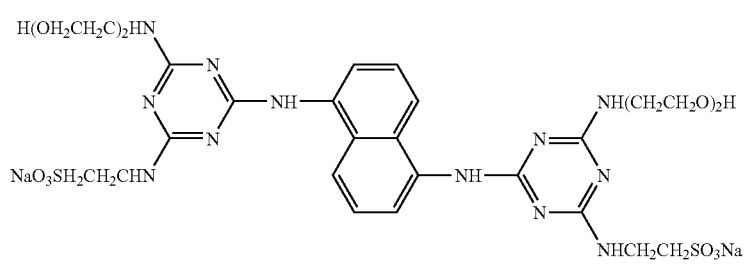
P-18
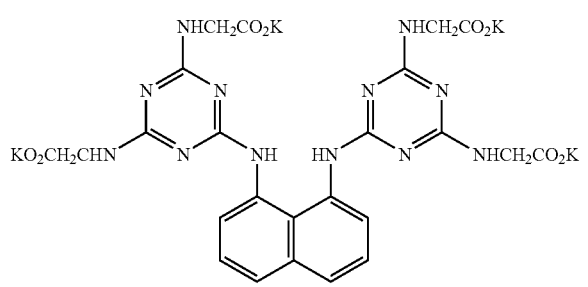
P-19
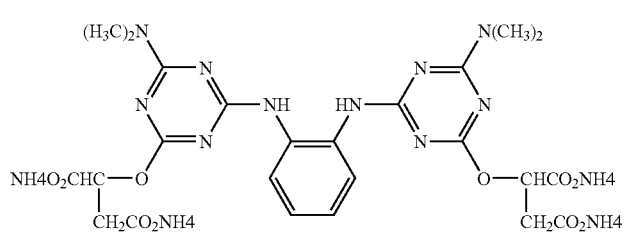
P-20
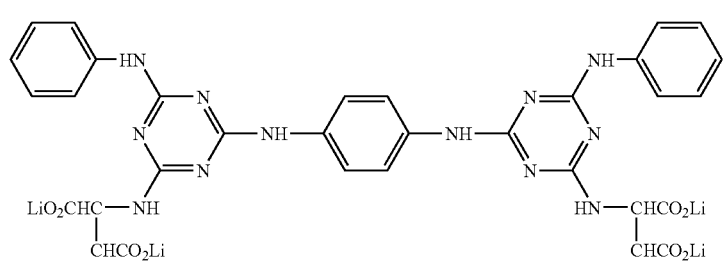

-continued
P-21
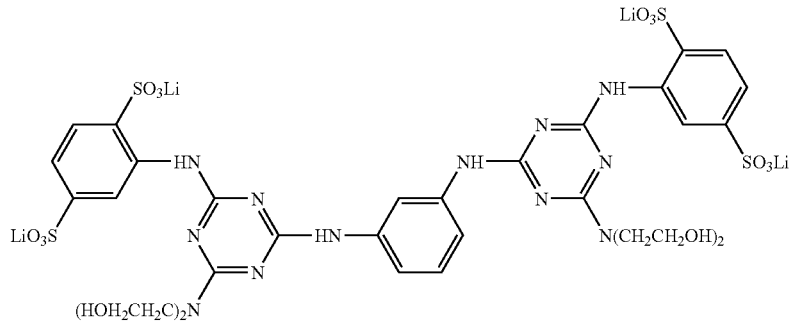
P-22
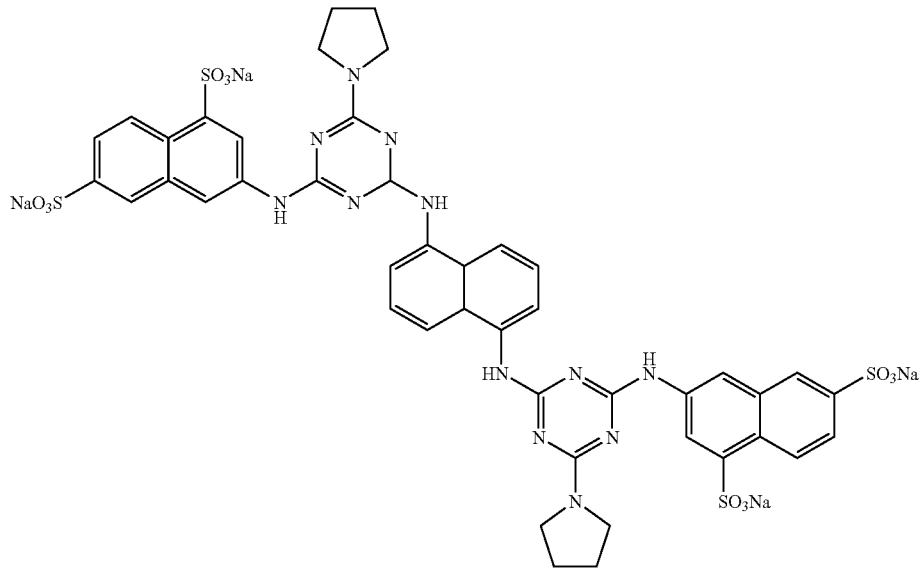
P-23
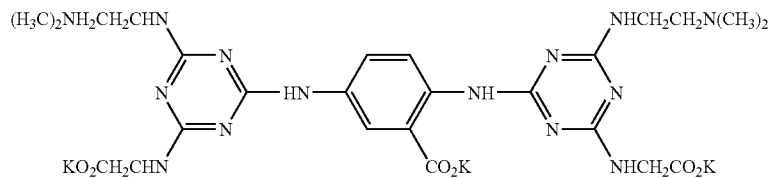
P-24
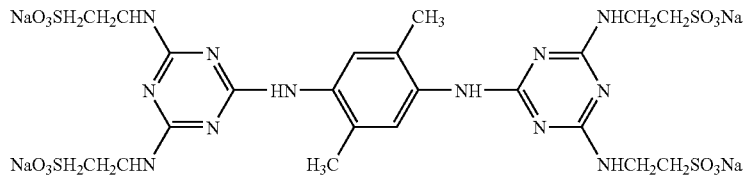
P-25
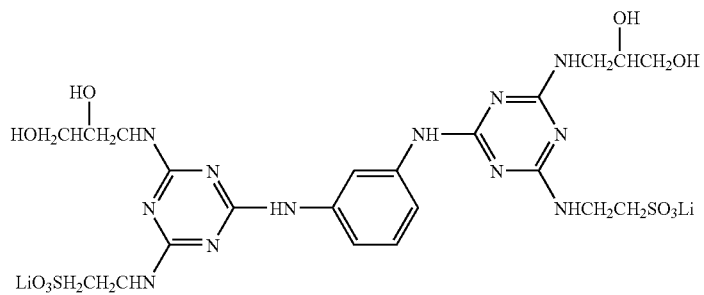

-continued
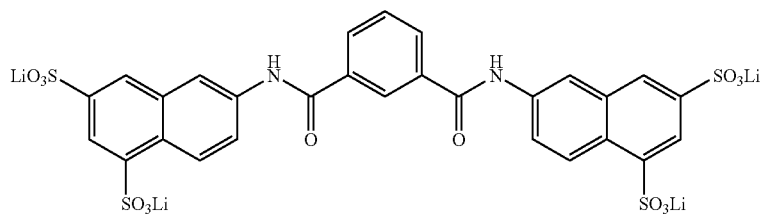
P-26
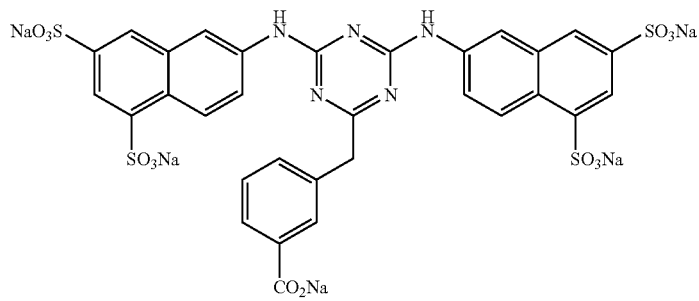
P-27
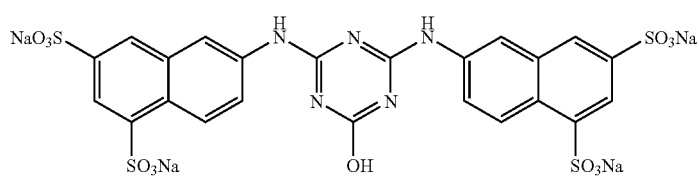
P-28
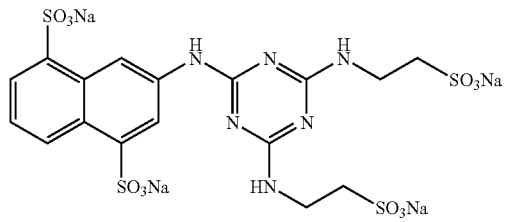
P-29
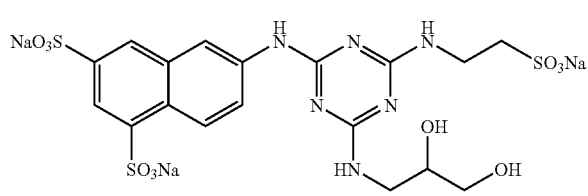
P-30
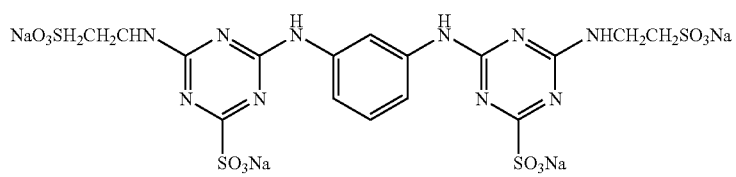
P-31
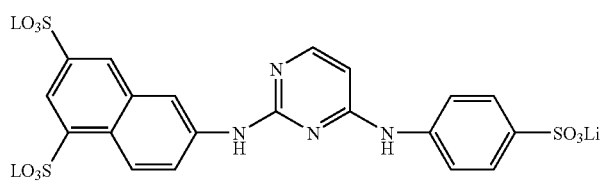
P-32

The preferred planar compounds in the invention can be easily synthesized with reference to the above-described JP-A-2002-139822.

A planar compound for use in the invention preferably has the following properties in addition to the above-described structural characteristics. A planar compound has a greater function to reduce the viscosity of an ink stock solution as compared with deionized water. That is, taking the viscosity of the ink stock solution in the invention as V0, and the viscosity measured by adding the same amount of deionized water as the amount of the planar compound removed from the ink stock solution as V1, the relationship of V0<V1 is given, preferably $\Delta V=V1-V0$ is 10 mPa·s or more, and more preferably 20 mPa·s or more.

The addition amount of a planar compound to an ink stock solution is preferably from 0.1 to 10 mass %, more preferably from 0.1 to 7 mass %, and still more preferably from 0.1 to 5 mass %.

The coefficient of viscosity of the ink stock solution in the invention is preferably from 1 to 10 mPa·s, more preferably from 1 to 8 mPa·s, and still more preferably from 1 to 6 mPa·s. When the coefficient of viscosity of the ink stock solution is 1 mPa·s or less, a great amount of a planar compound is necessary, so that not preferred. When the coefficient of viscosity of the ink stock solution is 10 mPa·s or more, there are cases where the adjustment of the viscosity of the ink stock solution is difficult, and not preferred in view of handling in manufacture such as transfer and filtration of the ink stock solution.

For adjusting the viscosity of an ink stock solution to a preferred range, the ratio of the addition amount of a planar compound to the dye in an ink stock solution is preferably from 0.01 to 1, more preferably from 0.01 to 0.3, and especially preferably from 0.01 to 0.2.

It is preferred that the ink stock solution in the invention comprises a dye, a planar compound and a medium, and various additives described later may also be contained. The concentration of the components other than a dye may be in high concentration or low concentration as compared with the ink composition, and arbitrarily selected.

The medium is a solvent having a function of dissolving and/or dispersing a dye and other components, and deionized water and super pure water (18 MΩ or more) are preferably used. If necessary, a mixture of deionized water and super pure water with a small amount of water-miscible organic solvent may be used.

As the components other than a dye, it is preferred to contain an antiseptic and a pH adjustor. As described later in the manufacturing method of an ink composition using an ink stock solution, these components are preferably prepared without being added to an ink stock solution for the purpose of making the manufacturing process easy and at the same time manufacturing an ink composition having a stable quality. However, these components may be added in the manufacture of an ink composition, if necessary.

In an ink stock solution, there is a case where the occurrence of insoluble products due to putrefaction becomes a problem. To prevent putrefaction, it is preferred to add an antiseptic to an ink stock solution.

Various antiseptics can be used in the invention.

As antiseptics, inorganic antiseptics containing a heavy metal ion (silver ion-containing substances, etc.) and salts can be exemplified first. As organic antiseptics, various compounds can be used, e.g., quaternary ammonium salts (tetrabutylammonium chloride, cetylpyridinium chloride, benzyltrimethylammonium chloride, etc.), phenol derivatives (phenol, cresol, butylphenol, xylenol, bisphenol, etc.), phenoxy ether derivatives (phenoxyethanol, etc.), heterocyclic compounds (benzotriazole, proxel, 1,2-benzo-isothiazolin-3-one, etc.), acid amides, carbamic acid, carbamates, amidine-guanidines, pyridines (sodium pyridinethione-1-oxide, etc.), diazines, triazines, pyrrole•imidazoles, oxazole•oxazines, thiazole•thiadiazines, thioureas, thiosemicarbazides, dithio-carbamates, sulfides, sulfoxides, sulfones, sulfamides, antibiotics (penicillin, tetracycline, etc.), sodium dehydroacetate, sodium benzoate, ethyl p-hydroxybenzoate, and salts thereof are exemplified. As antiseptics, those described in *Bohkin Bohbaizai Jiten* (*Antibacterial and Antifungal Agents Thesaurus*), edited by Nippon Bohkin Bohbai Gakkai (1986), can also be used.

Antiseptics can be added to an ink stock solution alone or two or more in combination.

These compounds may have various structures as an oil-soluble and a water-soluble, but water-soluble compounds are preferred.

Above all, it is preferred that at least one kind of antiseptic is a heterocyclic compound.

In the invention, the effect of the invention is further exhibited when two or more kinds of antiseptics are used in combination. For example, combination of heterocyclic compounds with antibiotics and combination of heterocyclic compounds with phenol derivatives are preferably used. The ratio of the addition amounts in the case of using two kinds of antiseptics in combination is not particularly restricted, but the ratio in the range of antiseptic A/antiseptic B of from 0.01 to 100 (by mass) is preferred.

The addition amount of an antiseptic to an ink stock solution can be selected in a wide range, preferably from 0.001 to 10 mass %, and more preferably from 0.1 to 5 mass %.

The pH of the ink stock solution in the invention is preferably from 4.0 to 10.0, more preferably from 5.5 to 9.5, and especially preferably from 7 to 9.5.

pH Adjustors include organic bases and inorganic bases as basic compounds, and organic acids and inorganic acids as acid compounds.

As basic compounds, inorganic compounds, e.g., sodium hydroxide, potassium hydroxide, lithium hydroxide, sodium carbonate, potassium carbonate, lithium carbonate, sodium hydrogencarbonate, (sodium bicarbonate), potassium hydrogen-carbonate, lithium hydrogencarbonate, sodium acetate, potassium acetate, sodium phosphate, and sodium monohydrogen-phosphate, organic bases, e.g., aqueous ammonia, methylamine, ethylamine, diethylamine, triethylamine, ethanolamine, diethanolamine, triethanolamine, ethylenediamine, piperidine, diazabicyclooctane, diazabicycloundecene, pyridine, quinoline, picoline, lutidine, and collidine, and alkali metal salts of organic acids, e.g., lithium benzoate and potassium phthalate can also be used.

As acid compounds, inorganic compounds, e.g., hydrochloric acid, sulfuric acid, phosphoric acid, boric acid, sodium hydrogensulfate, potassium hydrogensulfate, potassium dihydrogenphosphate, and sodium dihydrogenphosphate, and organic compounds, e.g., acetic acid, tartaric acid, benzoic acid, trifluoroacetic acid, methanesulfonic acid, ethane-sulfonic acid, benzenesulfonic acid, p-toluenesulfonic acid, saccharinic acid, phthalic acid, picolinic acid, and quinolinic acid can also be used.

When a water-soluble dye is used, it is preferred that an ink stock solution is prepared by dissolving the dye in an aqueous solvent, and when an oil-soluble dye is used, the dye is dissolved and/or dispersed in a lipophilic solvent and/or an aqueous solvent. The aqueous solvent is a solvent mainly comprising water, and an organic solvent, e.g., a water-miscible organic solvent is contained, if necessary. The lipophilic solvent is a solvent mainly comprising an organic solvent.

The usage of the ink stock solution of the invention is not especially limited but it is preferred to use for ink jet recording.

In manufacturing the ink stock solution of the invention, it is preferred to provide a process for adjusting viscosity by adding a planar compound after adding and dissolving a dye to water.

As the manufacturing process of the ink stock solution, a method of preparing an aqueous solution of dye (including the components other than the dye, if necessary) first, and then adding a planar compound to reduce the viscosity of the ink stock solution can be exemplified. The planar compound homogeneously dissolved may be added to the aqueous solution of dye while measuring the viscosity qualitatively or quantitatively, or the addition amount of the planar compound may determined in advance and added to the aqueous solution of dye. In the manufacturing of the ink stock solution, it is preferred that the process of adding the planar compound to adjust viscosity is a final process, but a process of adding other components or filtering process may be provided simultaneously with or after the process of adjusting viscosity.

It is preferred that the aqueous solution of dye is prepared while heating. The heating temperature is preferably from 30 to 80° C., and more preferably from 35 to 70° C.

As another manufacturing method of the ink stock solution of the invention, a method including a process of dissolving at least a dye, water and a planar compound in the state of coexistence in the manufacture of the ink stock solution can be exemplified.

The process of dissolving at least a dye, water and a planar compound in the state of coexistence is a process of dissolving the planar compound and, if necessary, other components at the same time with the step of dissolving the dye in water, and it is preferred that this process is generally used in the initial process of the preparation of the ink stock solution. The initial process is preferably a final process (when the later-described filtering process is performed, the pre-stage of the filtering process), but a process of adding other components may be provided after or before this process.

In the latter manufacturing process, a dye and the like may be dissolved while heating similarly to the former manufacturing process.

The above two manufacturing methods of the ink stock solution of the invention are the cases of water-soluble dyes, but the similar technical concept can also be applied to oil-soluble dyes.

The ink composition in the invention is manufactured by using the ink stock solution. The ink composition can be manufactured by dissolution and dispersion of the ink stock solution in an aqueous medium. The aqueous medium is a medium comprising water or a mixture of water and a water-miscible organic solvent, and, if necessary, additives such as a surfactant, a lubricant, a stabilizer and an antiseptic. The manufacturing methods of an ink composition are disclosed in detail in JP-A-5-148436, JP-A-5-295312, JP-A-7-97541, JP-A-7-82515 and JP-A-7-118584, and these methods can also be used in the manufacture of the ink for ink jet recording of the invention.

The coefficient of viscosity of an ink composition is preferably from 1 to 20 mPa·s. When an ink composition is used for the ink for ink jet recording, the viscosity is more preferably from 1 to 15 mPa·s, and still more preferably from 1 to 10 mPa·s.

The usage of the ink composition in the invention is not especially restricted. The ink composition of the invention can be preferably used as an ink composition for printing such as ink jet printing, an ink sheet in a heat-sensitive recording material, color toner for electrophotography, color filters used in display such as LCD and PDP and an image pickup element such as CCD, and for preparation of dye solutions for dyeing various fibers, but it is especially preferred to use as the ink composition for ink jet recording.

For the manufacture of the ink composition of the invention, the above ink stock solution is used.

The ink composition of the invention is preferably a cyan ink composition, but the ink composition is not limited to a cyan ink composition, and ink compositions of arbitrary colors by the mixture with other dyes or pigments are also included.

The manufacture of the ink composition in the invention includes a process of manufacturing an ink composition having the above range of viscosity by using at least the above ink stock solution (hereinafter also referred to as "a solution-preparing process").

A solution-preparing process is a process of preparing an ink composition having a specific range of viscosity for desired use from the ink stock solution as obtained above, and the prepared ink composition may be a final product or an intermediate product. The solution-preparing process includes at least a process of diluting the ink stock solution with a medium, preferably an aqueous medium. The medium for use in the dilution process of an ink stock solution containing an oil-soluble dye is not especially restricted, but it is preferred to be emulsion-dispersed in an aqueous medium and prepared as an aqueous ink composition. Various components having various concentrations may be contained in the medium, or such components may be separately added to the ink stock solution, or both methods may be combined.

Since the ink composition prepared by the manufacturing method of the invention is manufactured with an ink stock solution having higher dye concentration, the solubility of the dye is improved as compared with the ink compositions prepared by ordinary methods, so that the ejection stability in ink jet recording is increased.

The total content of the dyes in the ink composition in the invention is from 0.2 to 20 mass %, and more preferably from 0.5 to 15 mass %.

In manufacturing the ink stock solution, it is preferred to provide a process of filtration of dusts of solids. Filters having an effective pore diameter of 1 μm or less, and preferably 0.3 μm or less, are used in this operation. Various materials can be used as filters, but in the case of the ink stock solution of water-soluble dyes, it is preferred to use filters manufactured for an aqueous solvent. Above all, it is especially preferred to use jacket type filters made of polymer materials that hardly produce fuzz. Any means can be used for filtration, e.g., filtration by passing a solution through a jacket by solution feeding, pressure filtration, and filtration under reduced pressure.

Since a planar compound is used in the invention, filtration process can be performed with no resistance. However, when a planar compound is not used, filtration process takes a lot of time.

In the manufacturing process of an ink stock solution or in a solution-preparing process, various methods can be used for dissolving dyes and other components, e.g., dissolution by stirring, dissolution by ultrasonic wave irradiation, and dissolution by shaking can be used. Dissolution by stirring is especially preferably used. Various methods well known in the industry can be used in stirring, e.g., fluid stirring and stirring utilizing shearing force by a reaction agitator and a dissolver can be used. On the other hand, a stirring method utilizing the shearing force with the bottom of a container such as a magnetic stirrer can be also preferably used.

Dyes that are used in the ink stock solution and the ink composition of the invention are described below. Dyes are not especially restricted but aggregating dyes (hereinafter, the dyes for use in the invention such as aggregating dyes are also generally referred to as dyes for the invention) are preferably used. It is preferred that the invention contains at least one kind of aggregating dye, but other dyes and/or pigments may also be used in combination.

The term "substituted" in "substituted alkyl group" and the like used in the specification of the invention means that the hydrogen atom present in "an alkyl group" and the like is being substituted with a specific substituent. "An alkyl group having a substituent" is also the same meaning as the above substituted alkyl group and the like. "An alkyl group that may be substituted" means to include a general (unsubstituted) alkyl group and the above substituted alkyl group, and this also applies to other heterocyclic group and the like that may be substituted.

As the aggregating dyes that are the dyes for the invention, the dyes disclosed in JP-A-2004-83903, JP-A-2003-277662, JP-A-2003-277661 (the above are yellow dyes), JP-A-2003-339381, WO 2002/83662, WO 2002/83795 (the above are magenta dyes), JP-A-2004-315758, JP-A-2004-315807, JP-A-2004-323605, JP-A-2004-331871 (the above are cyan dyes), JP-A-2004-115620, JP-A-2004-331699 (the above are black dyes) are exemplified. In the invention, phthalocyanine dyes having an aggregating group are preferred. The phthalocyanine dyes having an aggregating group are explained below. The aggregating group means a group at least having in the group a bonding portion (or a functional group) capable of at least hydrogen bonding between molecules. It is possible to have one or more bonding portions in one group. As the bonding portion, a hydroxyl group, an amino group, an amido bond, an oxide bond, etc., are exemplified, and hydrogen bonding is formed between the same kind or different kinds. The aggregating group may be a group capable of hydrogen bonding between a phthalocyanine dye and an arbitrary additive.

The phthalocyanine dye having an aggregating group is preferably a compound represented by the following formula (C). The compound represented by formula (C) is preferably a cyan dye. It is preferred for the dye to have at least one of the characteristics (oxidation potential, aggregating property) described below, and it is more preferred to have all the characteristics.

Formula (C)

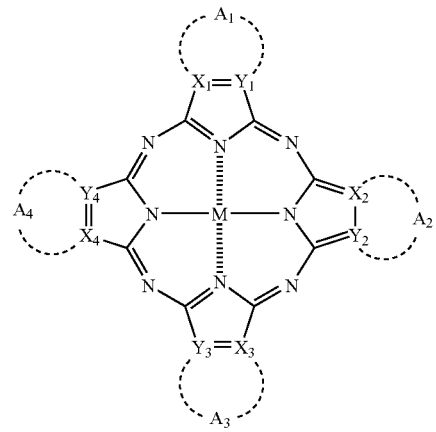

In formula (C), $X_1$, $X_2$, $X_3$, $X_4$, $Y_1$, $Y_2$, $Y_3$ and $Y_4$ each independently represents a carbon atom or a nitrogen atom, preferably a carbon atom. Each of $X_1$ and $Y_1$, $X_2$ and $Y_2$, $X_3$ and $Y_3$, and $X_4$ and $Y_4$ does not represent a nitrogen atom at the same time. $A_1$ represents an atomic group necessary to form an aromatic ring or a heterocyclic ring together with $X_1$ to $X_4$ and $Y_1$ to $Y_4$, $A_2$ represents an atomic group necessary to form an aromatic ring or a heterocyclic ring together with $X_1$ to $X_4$ and $Y_1$ to $Y_4$, $A_3$ represents an atomic group necessary to form an aromatic ring or a heterocyclic ring together with $X_1$ to $X_4$ and $Y_1$ to $Y_4$, $A_4$ represents an atomic group necessary to form an aromatic ring or a heterocyclic ring together with $X_1$ to $X_4$ and $Y_1$ to $Y_4$. The heterocyclic ring formed is preferably a nitrogen-containing 6-membered ring. Each of $A_1$ to $A_4$ may have a substituent, and at least one of $A_1$ to $A_4$, or at least one of the substituents of $A_1$ to $A_4$ has a substituent for imparting solubility (when the dye is water-soluble, the substituent is an ionic hydrophilic group, and when the dye is oil-soluble, a hydrophobic group).

M represents a hydrogen atom, a metallic element, a metallic oxide, a metallic hydroxide, or a metal halide.

Of the phthalocyanine dyes represented by formula (C), a phthalocyanine dye having a structure represented by the following formula (C-a) is more preferred.

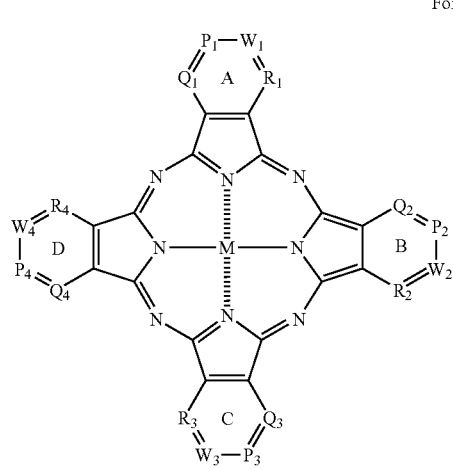

Formula (C-a)

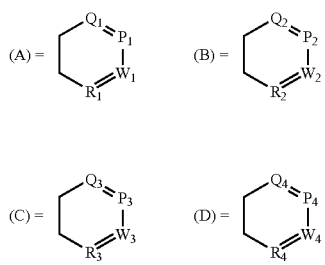

In formula (C-a), $Q_1$, $Q_2$, $Q_3$, $Q_4$, $W_1$, $W_2$, $W_3$, $W_4$, $R_1$, $R_2$, $R_3$ and $R_4$ each represents (=C($J_1$)- and/or —N=), (=C($J_2$)- and/or —N=), (=C($J_3$)- and/or —N=) or (=C($J_4$)- and/or —N=), $J_1$, $J_2$, $J_3$ and $J_4$ each represents a hydrogen atom or a substituent. Of four rings of ($Q_1$, $P_1$, $W_1$, $R_1$), ($Q_2$, $P_2$, $W_1$, $R_2$), ($Q_3$, $P_3$, $W_3$, $R_3$) and ($Q_4$, $P_4$, $W_4$, $R_4$) [ring A: (A), ring B: (B), ring C: (C), ring D: (D)], it is preferred that at least one ring is an aromatic ring, and more preferably two or more are aromatic rings. When arbitrary ring of ring A, ring B, ring C and ring D is a heterocyclic ring, a pyridine ring or a pyrazine ring is preferred. When $J_1$ to $J_4$ each represents a substituent, an electron attractive substituent is preferred, further at least one of $J_1$ to $J_4$, or at least one of the substituents of $J_1$ to $J_4$ has a substituent for imparting solubility (when the dye is water-soluble, the substituent is an ionic hydrophilic group, and when the dye is oil-soluble, a hydrophobic group). M has the same meaning as M in formula (C).

In formula (C-a), when an arbitrary ring of ring A, ring B, ring C and ring D is an aromatic ring, the aromatic ring is preferably represented by the following formula.

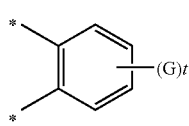

Formula (C-b)

In formula (C-b), * means to be bonded at this position to form a phthalocyanine skeleton. In the specification of the invention, the near side from * in the above benzene ring is called α-position, and the farther side from * is called β-position. Formula (C-b) represents that the substitution position of G is not specified at either α-position or β-position. G represents —SO-Z, —SO$_2$-Z, —SO$_2$NV$_1$V$_2$, —CONV$_1$V$_2$, —CO$_2$Z, —COZ, or a sulfo group. t represents an integer of from 1 to 4. In formula (C-b), a preferred case is that G represents —SO-Z, —SO$_2$-Z, —SO$_2$NV$_1$V$_2$, —CONV$_1$V$_2$, —CO$_2$Z, or a sulfo group, especially preferred case is that G represents —SO-Z, —SO$_2$-Z, or —SO$_2$NV$_1$V$_2$, and the most preferred case is that G represents —SO$_2$-Z. t preferably represents 1 or 2, and most preferably 1.

Z, which may be the same or different, each represents an alkyl group, a cycloalkyl group, an alkenyl group, an alkynyl group, an aralkyl group, an aryl group, or a heterocyclic group (these groups may be substituted with a substituent). Z preferably represents an alkyl group, an aryl group or a heterocyclic group, and most preferably a substituted alkyl group, a substituted aryl group, or a substituted heterocyclic group.

$V_1$ and $V_2$, which may be the same or different, each represents a hydrogen atom, an alkyl group, a cycloalkyl group, an alkenyl group, an alkynyl group, an aralkyl group, an aryl group, or a heterocyclic group (these groups may be substituted with a substituent). $V_1$ and $V_2$ preferably represent a hydrogen atom, an alkyl group, an aryl group, or a heterocyclic group, and most preferably a hydrogen atom, a substituted alkyl group, a substituted aryl group, or a substituted heterocyclic group.

In formula (C-a), when arbitrary rings of ring A, ring B, ring C and ring D are aromatic rings, it is especially preferred that at least one ring is represented by the following formula (C-c). Formula (C-c) represents that the substitution position of G is the β-position.

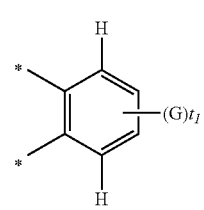

Formula (C-c)

In formula (C-c), * means to be bonded at this position to form a phthalocyanine skeleton. G has the same meaning as G in formula (C-b), and the preferred case, the especially preferred case and the most preferred case are also the same as those in formula (C-b). $t_1$ is 1 or 2, and most preferably 1. It is especially preferred that all the aromatic rings are represented by formula (C-c).

Of the phthalocyanine dyes, particularly preferred dyes are represented by formula (C-d).

Formula (C-d)

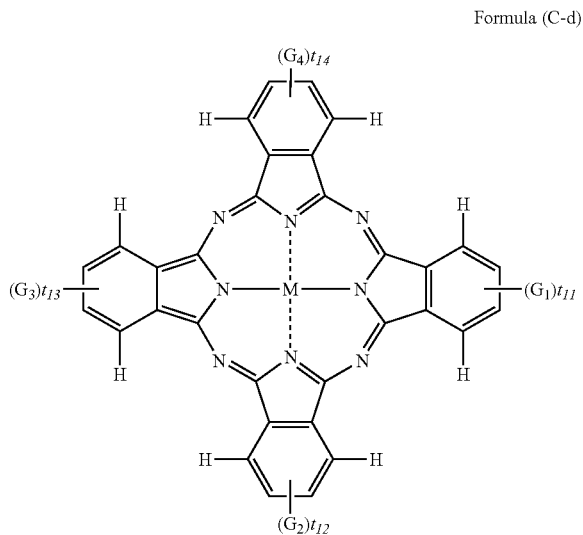

In formula (C-d), $G_1$, $G_2$, $G_3$ and $G_4$ are the same as G in formula (C-b), and the preferred case, the especially preferred case and the most preferred case are also the same as those in formula (C-b). M has the same meaning as M in formula (C). $t_{11}$, $t_{12}$, $t_{13}$ and $t_{14}$ each represents 1 or 2, and 1 is most preferred.

As disclosed in JP-A-2003-213168, phthalocyanine dyes are generally not single structural compounds in almost all the cases and they are mixtures of the compounds having different chemical structures originating in synthesis methods, excluding the case of preparation using as the starting material a phthalonitrile derivative in which the substituents on the benzene ring are in the relationship of linear symmetry. In the invention, "phthalocyanine dye" is a generic name including a single structure and mixture.

The substituents in formulae (C) to (C-d) are described in detail below.

As the substituents that formula (C) may have, a halogen atom, an alkyl group, a cycloalkyl group, an alkenyl group, an alkynyl group, an aralkyl group, an aryl group, a heterocyclic group, a cyano group, a hydroxyl group, a nitro group, an amino group, an alkylamino group, an arylamino group, an alkoxyl group, an aryloxy group, an acylamino group, a ureido group, a sulfamoylamino group, an alkylthio group, an arylthio group, an alkoxycarbonylamino group, a sulfonamido group, a carbamoyl group, a sulfamoyl group, a sulfonyl group, a sulfinyl group, an alkoxycarbonyl group, a heterocyclic oxy group, an azo group, an acyloxy group, a carbamoyloxy group, a silyloxy group, an aryloxycarbonyl group, an aryloxy-carbonylamino group, an imido group, a heterocyclic thio group, a phosphoryl group, an acyl group, a carboxyl group, a phosphono group and a sulfo group are exemplified. Of these groups, the groups whose hydrogen atoms can be substituted with a substituent may be substituted.

In formula (C-a), the above substituents can be exemplified as $J_1$ to $J_4$, and the preferred examples of the electron attractive groups are a halogen atom, a heterocyclic group, a cyano group, a carboxyl group, a sulfonamido group, a sulfamoyl group, a carbamoyl group, an alkoxycarbonyl group, a sulfonyl group, a sulfinyl group, an imido group, an acyl group, a sulfo group and a quaternary ammonium group. Of these groups, the groups whose hydrogen atoms can be substituted with a substituent may be substituted.

In formulae (C-b), (C-c) and (C-d), the alkyl group represented by Z, $V_1$ and $V_2$ is preferably an alkyl group having from 1 to 30 carbon atoms. For the reason that the solubility of dyes and ink stability are improved, a branched alkyl group is preferred, and a case of having asymmetric carbon atoms (the use as a racemic body) is especially preferred.

As the examples of the substituents of the substituted alkyl group, the substituents that the compound represented by formula (C) may have can be exemplified, and a hydroxyl group, an ether group, an ester group, a cyano group, an amino group, an amido group and a sulfonamido group are especially preferred for the reason that the aggregating property of the dyes can be heightened and fastness can be improved. In addition to these groups, the substituted alkyl group may have a halogen atom and an ionic hydrophilic group as substituents.

The cycloalkyl group represented by Z, $V_1$ and $V_2$ is preferably a cycloalkyl group having from 5 to 30 carbon atoms. A case of having asymmetric carbon atoms (the use as a racemic body) is especially preferred for the reason that the solubility of dyes and ink stability are improved. As the examples of the substituents of the substituted cycloalkyl group, the substituents that the compound represented by formula (C) may have can be exemplified, and a hydroxyl group, an ether group, an ester group, a cyano group, an amino group, an amido group and a sulfonamido group are especially preferred for the reason that the aggregating property of the dyes can be heightened and fastness can be improved. In addition to these groups, the substituted cycloalkyl group may have a halogen atom and an ionic hydrophilic group as substituents.

The alkenyl group represented by Z, $V_1$ and $V_2$ is preferably an alkenyl group having from 2 to 30 carbon atoms. For the reason that the solubility of dyes and ink stability are improved, a branched alkenyl group is preferred, and a case of having asymmetric carbon atoms (the use as a racemic body) is especially preferred. As the examples of the substituents of the substituted alkenyl group, the substituents that the compound represented by formula (C) may have can be exemplified, and a hydroxyl group, an ether group, an ester group, a cyano group, an amino group, an amido group and a sulfonamido group are especially preferred for the reason that the aggregating property of the dyes can be heightened and fastness can be improved. In addition to these groups, the substituted alkenyl group may have a halogen atom and an ionic hydrophilic group as substituents.

The aralkyl group represented by Z, $V_1$ and $V_2$ is preferably an aralkyl group having from 7 to 30 carbon atoms. For the reason that the solubility of dyes and ink stability are improved, a branched aralkyl group is preferred, and a case of having asymmetric carbon atoms (the use as a racemic body) is especially preferred. As the examples of the substituents of the substituted aralkyl group, the substituents that the compound represented by formula (C) may have can be exemplified, and a hydroxyl group, an ether group, an ester group, a cyano group, an amino group, an amido group and a sulfonamido group are especially preferred for the reason that the aggregating property of the dyes can be heightened and fastness can be improved. In addition to these groups, the substituted aralkyl group may have a halogen atom and an ionic hydrophilic group as substituents.

The aryl group represented by Z, $V_1$ and $V_2$ is preferably an aryl group having from 6 to 30 carbon atoms. As the examples of the substituents of the substituted aryl group, the substituents that the compound represented by formula (C) may have can be exemplified, and an electron attractive group is especially preferred for the reason that the oxidation potential of the dyes can be made noble and fastness can be improved.

The heterocyclic group represented by Z, $V_1$ and $V_2$ is preferably a 5- or 6-membered ring, which may further be condensed. The heterocyclic group may be an aromatic heterocyclic ring or a non-aromatic heterocyclic ring. The heterocyclic groups represented by Z, $V_1$ and $V_2$ are shown below in the form of heterocyclic rings without showing the position of substitution. The position of substitution is not limited, and, for example, pyridine can be substituted at the 2-position, 3-position and 4-position. As the examples of heterocyclic rings, pyridine, pyrazine, pyrimidine, pyridazine, triazine, quinoline, isoquinoline, quinazoline, cinnoline, phthalazine, quinoxaline, pyrrole, indole, furan, benzofuran, thiophene, benzothiophene, pyrazole, imidazole, benzimidazole, triazole, oxazole, benzoxazole, thiazole, benzothiazole, isothiazole, benzisothiazole, thiadiazole, isoxazole, benzisoxazole, pyrrolidine, piperidine, piperazine, imidazolidine, thiazoline, etc., are exemplified. Aromatic heterocyclic groups are preferred above all, e.g., pyridine, pyrazine, pyrimidine, pyridazine, triazine, pyrazole, imidazole, benzimidazole, triazole, thiazole, benzothiazole, isothiazole, benzisothiazole, and thiadiazole are exemplified in the same manner as above. As the examples of the substituents of the substituted heterocyclic groups, the substituents that the compound represented by formula (C) may have can be exemplified, and an electron attractive group is especially preferred for the reason that the oxidation potential of the dyes can be made noble and fastness can be improved.

When the compound represented by formula (C) is a water-soluble compound, the substituent that compound represented by formula (C) may have is preferably an ionic hydrophilic group. The examples of the ionic hydrophilic groups include a sulfo group, a carboxyl group, a phosphono group, and a quaternary ammonium group. As the ionic hydrophilic groups, a carboxyl group, a phosphono group, and a sulfo group are preferred, and a carboxyl group and a sulfo group are especially preferred. The carboxyl, phosphono and sulfo groups may take the form of a salt. As the examples of the counter ions for forming a salt, ammonium, alkali metal ions (e.g., a lithium ion, a sodium ion, a potassium ion), and organic cations (e.g., a tetramethyl-ammonium ion, a tetramethylguanidinium ion, a tetramethyl-phosphonium ion) are included. Of the counter ions, alkali metal ions are preferred, and a lithium salt is especially preferred for the reason that the solubility of dyes and ink stability are improved. The most preferred ionic hydrophilic group is a lithium salt of a sulfo group.

The number of ionic hydrophilic groups is preferably two or more in one molecule of the phthalocyanine dye of the invention, and it is especially preferred to have two or more sulfo groups and/or carboxyl groups.

When the compound represented by formula (C) is an oil-soluble compound, the substituent that the compound represented by formula (C) may have is preferably a hydrophobic group. As the preferred hydrophobic groups, aliphatic groups having 4 or more carbon atoms (an alkyl group, a cycloalkyl group, an alkenyl group, an alkynyl group), an aryl group, an alkoxyl group, an aryloxy group, an acylamino group, an alkylthio group, an arylthio group, an alkoxycarbonylamino group, a sulfonamido group, a carbamoyl group, a sulfamoyl group, a sulfonyl group, an alkoxycarbonyl group, an acyloxy group, an amino group (including an anilino group), and an acyl group each of which have 6 or more carbon atoms can be exemplified.

M represents a hydrogen atom, a metallic element, a metallic oxide, a metallic hydroxide, or a metal halide.

M preferably represents a hydrogen atom, a metallic atom, e.g., Li, Na, K, Mg, Ti, Zr, V, Nb, Ta, Cr, Mo, W, Mn, Fe, Co, Ni, Ru, Rh, Pd, Os, Ir, Pt, Cu, Ag, Au, Zn, Cd, Hg, A, Ga, In, Si, Ge, Sn, Pb, Sb, Bi, etc., a metallic oxide, e.g., VO, GeO, etc., or a metallic hydroxide, e.g., $Si(OH)_2$, $Cr(OH)_2$, $Sn(OH)_2$, etc. Further, as a metal halide, e.g., $AlCl_2$, $SiCl_2$, VCl, $VCl_2$, VOCl, $FeCl_2$, GaCl, ZrCl, etc., are exemplified.

Above all, Cu, Ni, Zn and Al are preferred, and Cu is most preferred.

Pc (phthalocyanine ring) may form a dimer (e.g., Pc-M-L-M-Pc) or a trimer via L (a divalent linking group), and M at that time may be the same or different.

As the divalent linking group represented by L, an oxy group (—O—), a thio group (—S—), a carbonyl group (—CO—), a sulfonyl group (—$SO_2$—), an imino group (—NH—), a methylene group (—$CH_2$—), and groups formed by combining these groups are preferred.

As the preferred combinations of the substituents of the compound represented by formula (C) (hereinafter also referred to as compound (C)), a compound having at least one preferred group of the above-described preferred groups in various substituents is preferred, a compound in which more substituents are the above-described preferred groups is more preferred, and a compound in which all the substituents are the above-described preferred groups is most preferred.

As the chemical structure of compound (C), it is preferred to introduce at least one electron attractive group, such as a sulfinyl group, a sulfonyl group, a sulfamoyl group, to each benzene ring of phthalocyanine, and 1.2 or more in total of the σp value of the substituents of phthalocyanine skeleton at large.

Hammett's substitution constant σp value is described. Hammett's rule is a rule of thumb proposed by L. P. Hammett in 1935 to quantitatively discuss the influence of substituents on the reaction or equilibrium of benzene derivatives. The validity of this rule is now widely authorized. There are a σp value and a σm value in the substitution constant of Hammett's rule, and these values are found in many general publications, for example, described in detail in J. A. Dean compiled, *Lange's Handbook of Chemistry*, 12$^{th}$ Ed., McGraw Hill (1979), and *Kagaku no Ryoiki* (*The Domain of Chemistry*), Extra Number 122, pp. 96-103, Mankodo Publishing Co. (1979)

The specific examples of compounds (C) are shown below, but phthalocyanine dyes for use in the invention are not restricted to the following examples.

As water-soluble cyan dyes, the following dyes are exemplified.

TABLE 1

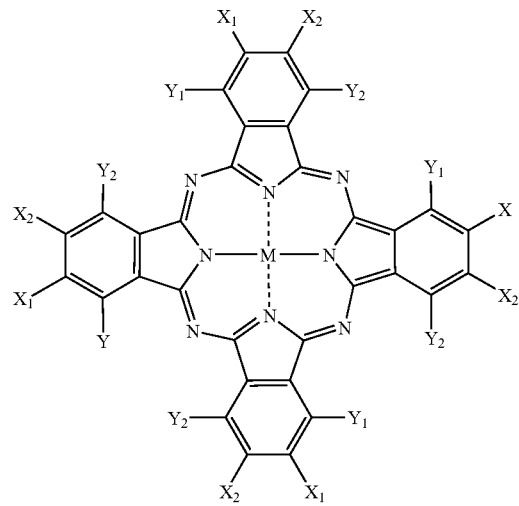

In the table, the specific examples of each group of the substituents (X1, X2), (Y1, Y2) on each benzene ring are in no particular order.

| Compound No. | M | X1 | X2 | Y1 | Y2 |
|---|---|---|---|---|---|
| C-1 | Cu | —SO₂NHCH₂CH₂SO₃Li | —H | —H | —H |
| C-2 | Cu | —SO₂NCH₂CHCONHCH₂CH₂SO₃Na<br>　　　　　\|<br>　　　　　OH | —H | —Cl | —H |
| C-3 | Cu | —SO₂NH—⟨C₆H₄⟩—SO₂NHCH₂CH₂SO₃Li | —H | —H | —H |
| C-4 | Cu | —SO₂NHCH₂CH₂SO₂NHCH₂CO₂Na | —CN | —H | —H |
| C-5 | Cu | —SO₂NH(CH₂)₃N⁺(CH₂CH₂OH)₂　H₃C—⟨C₆H₄⟩—SO₃⁻<br>　　　　　　　　　　　　　\|<br>　　　　　　　　　　　　　CH₃ | —H | —H | —H |
| C-6 | Cu | —SO₂CH₂CH₂CH₂SO₃Li | —H | —H | —H |
| C-7 | Cu | —SO₂CH₂CH₂CH₂SO₃Na | —H | —H | —H |
| C-8 | Cu | —SO₂CH₂CH₂CH₂SO₃K | —H | —H | —H |

TABLE 2

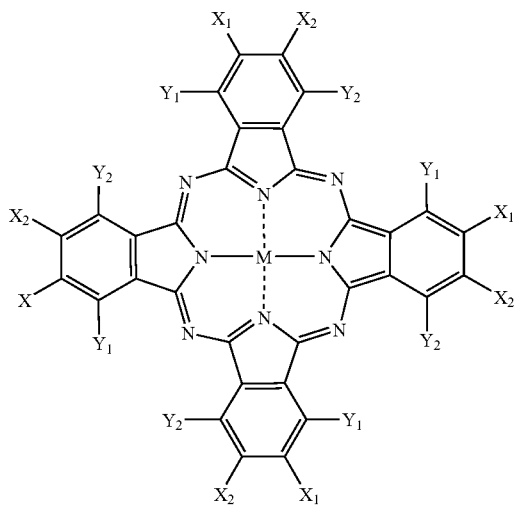

In the table, the specific examples of each group of the substiuents (X1, X2), (Y1, Y2) on each benzene ring are in no particular order

| Compound No. | M  | X1 | X2 | Y1 | Y2 |
|---|---|---|---|---|---|
| C-9  | Cu | —SO$_2$(CH$_2$)$_5$CO$_2$K | —H | —H | —H |
| C-10 | Cu | —SO$_2$CH$_2$CH(OH)CH$_2$SO$_3$Li | —H | —H | —H |
| C-11 | Cu | —SO$_2$CH$_2$CH$_2$CH(CH$_3$)SO$_3$Li | —H | —H | —H |
| C-12 | Cu | —SO$_2$CH$_2$CH$_2$CH(CH$_3$)SO$_2$NH—C$_6$H$_3$(SO$_3$Li)$_2$ | —H | —H | —H |
| C-13 | Cu | —SO$_2$CH$_2$CH$_2$OCH$_2$CH$_2$OCH$_2$CH$_2$SO$_3$Li | —H | —H | —H |
| C-14 | Cu | —CONHCH(CO$_2$K)CH$_2$CH$_2$SO$_3$K | —H | —H | —H |
| C-15 | Cu | —CO$_2$(CH$_2$)$_3$NH—[triazine-2,4-bis(NHCH$_2$CH$_2$CH(CH$_3$)SO$_3$Li)] | —H | —H | —H |

TABLE 3

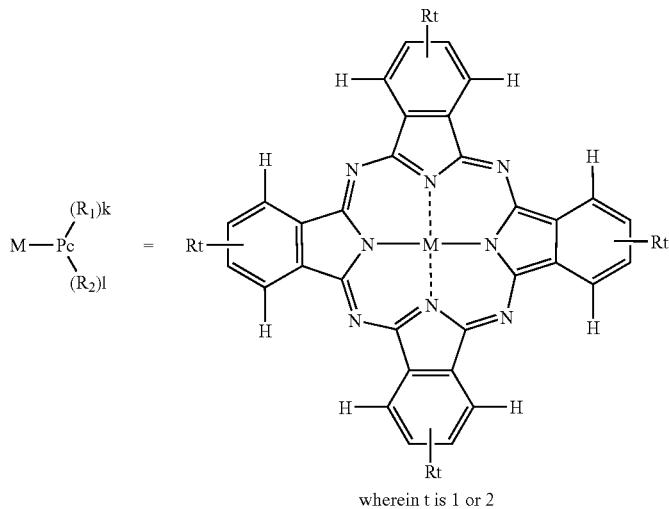

wherein t is 1 or 2

In the table, the introduction position and order of the specific examples of substituents (R1) and (R2) on the β-position are in no particular order.

The values of k and l represent the average value of the mixing ratio originated in charge molar ratio of phthalonitrile derivatives used in the synthesis of the phthalocyanine.

| Compound No. | M | R1 | k | R2 | l |
|---|---|---|---|---|---|
| C-16 | Cu | $-SO_2CH_2CH_2CH_2SO_3K$ | 2 | $-SO_2(CH_2)_3SO_2NH(CH_2)_2O(CH_2)_2OH$ | 2 |
| C-17 | Cu | $-SO_2CH_2CH_2CH_2SO_3Li$ | 3 | $-SO_2CH_2CH_2CH_2SO_2NHCH_2CH(OH)CH_3$ | 1 |
| C-18 | Cu | $-SO_2CH_2CH_2CH_2SO_3Li$ | 2 | $-SO_2CH_2CH_2CH_2SO_2NHCH_2CH(OH)CH_3$ | 2 |
| C-19 | Cu | $-SO_2CH_2CH_2CH_2SO_3Li$ | 1.5 | $-SO_2CH_2CH_2CH_2SO_2NHCH_2CH(OH)CH_3$ | 2.5 |
| C-20 | Cu | $-SO_2CH_2CH_2CH_2SO_3Li$ | 3 | $-SO_2CH_2CH_2CH_2SO_2NHCH_2CH(OH)CH_2OH$ | 1 |
| C-21 | Cu | $-SO_2CH_2CH_2CH_2SO_3Li$ | 3 | $-SO_2CH_2CH_2CH_2SO_2N(CH_2CH_2OH)_2$ | 1 |
| C-22 | Cu | $-SO_2CH_2CH_2CH(CH_3)SO_3Li$ | 3 | $-SO_2(CH_2)_3SO_2NH(CH_2)_2O(CH_2)_2OH$ | 1 |

TABLE 4

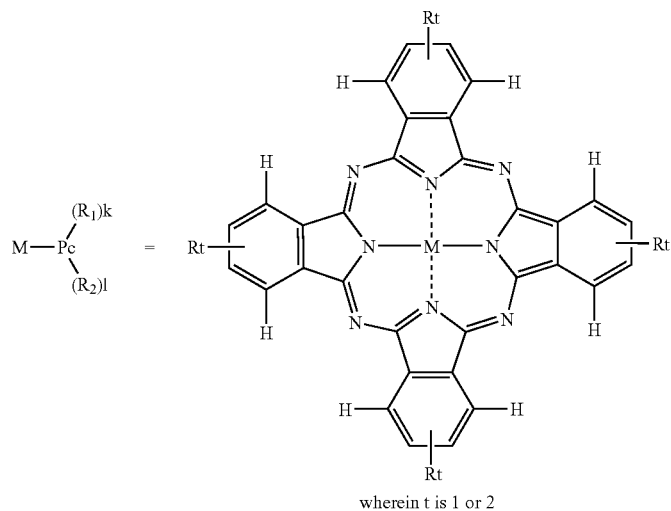

wherein t is 1 or 2

In the table, the introduction position and order of the specific examples of substituents (R1) and (R2) on the β-position are in no particular order.
The values of k and l represent the average value of the mixing ratio originated in charge molar ratio of phthalonitrile derivatives used in the synthesis of the phthalocyanine.

| Compound No. | M | R1 | k | R2 | l |
|---|---|---|---|---|---|
| C-23 | Cu | $-SO_2CH_2CH_2CH_2CO_2Na$ | 3 | $-SO_2CH_2CH_2CH_2SO_2NHCH_2CH(OH)CH_3$ | 1 |
| C-24 | Cu | $-SO_2(CH_2CH_2O)_2CH_2CH_2SO_3Li$ | 2 | $-SO_2CH_2CH_2CH_2SO_2NHCH(CH_3)CH_2OH$ | 2 |
| C-25 | Cu | $-SO_2CH_2CH_2CH_2SO_3Li$ | 2 | $-SO_2(CH_2CH_2O)_2CH_2CH_2OH$ | 2 |
| C-26 | Cu | $-SO_2CH_2CH_2CH_2SO_3Li$ | 3 | $-SO_2CH_2CH_2CH_2CO_2Li$ | 1 |
| C-27 | Cu | $-SO_2CH_2CH_2CH_2SO_3Li$ | 1 | $-SO_2CH_2CH_2CH_2SO_2NHCH_2CH(OH)CH_2SO_3Li$ | 3 |
| C-28 | Ni | $-SO_2(CH_2)_4SO_3Li$ | 1 | $-SO_2CH_2CH_2CH_2SO_2NHCH_2CH(OH)CH_2SO_3Li$ | 3 |
| C-29 | Zn | $-SO_2CH_2CH_2CH(CH_3)SO_3Li$ | 1 | $-SO_2CH_2CH_2CH_2SO_2NHCH_2CH(OH)CH_2SO_3Li$ | 3 |

TABLE 5

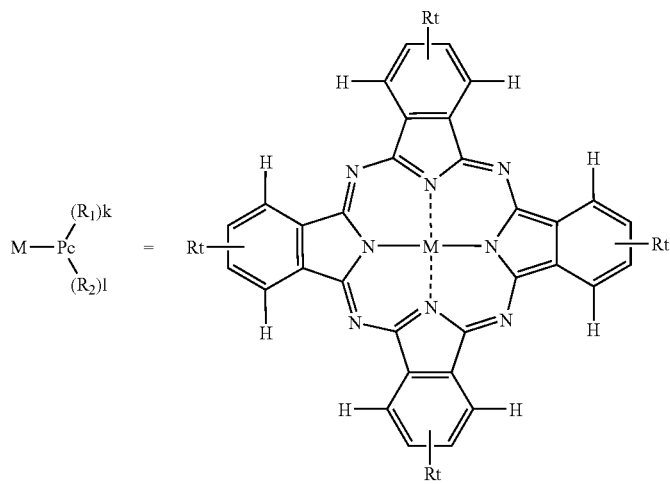

wherein t is 1 or 2

In the table, the introduction position and order of the specific examples of substituents
(R1) and (R2) on the β-position are in no particular order.
The values of k and l represent the average value of the mixing ratio originated in charge
molar ratio of phthalonitrile derivatives used in the synthesis of the phthalocyanine.

| Compound No. | M | R1 | k | R2 | l |
|---|---|---|---|---|---|
| C-30 | Cu | —SO$_2$CH$_2$CH$_2$CH$_2$SO$_3$Li | 3 | —SO$_2$—C$_6$H$_4$—CO$_2$Li (meta) | 1 |
| C-31 | Cu | —SO$_2$-(benzothiazole-SO$_3$Li) | 1 | —SO$_2$—C$_6$H$_4$—O(CH$_2$)$_4$SO$_3$Li | 3 |
| C-32 | Cu | —SO$_2$NHCH$_2$CH$_2$SO$_3$Li | 3 | —SO$_2$NHCH$_2$CH$_2$CH$_2$N(CH$_2$CH$_2$OH)$_2$ | 1 |
| C-33 | Cu | —SO$_2$CH$_2$CH$_2$CH$_2$SO$_3$Li | 3 | —SO$_2$NHCH$_2$CH(OH)CH$_2$OH | 1 |
| C-34 | Cu | —SO$_2$CH$_2$CH$_2$CH$_2$SO$_3$Li | 3 | —CONHCH$_2$CH$_2$OCH$_2$CH$_2$OH | 1 |
| C-35 | Cu | —SO$_2$CH$_2$CH$_2$CH$_2$SO$_3$Li | 3 | —CO$_2$(CH$_2$CH$_2$O)$_2$CH$_2$CH$_2$SO$_3$Li | 1 |

TABLE 6

In the table, M, (A), (B), (C) and (D) represent constituents of the phthalocyanine compound in formula (C-a),
but the specific examples of M, (A), (B), (C) and (D) are in no particular order.
The number of each constituent represents the average value of the mixing ratio originated
in charge molar ratio of phthalonitrile derivatives used in the synthesis of the phthalocyanine.

| Compound No. | M | (A) | (B) | (C) | (D) |
|---|---|---|---|---|---|
| C-36 | Cu | 3,4-dimethylphenyl-SO$_2$(CH$_2$)$_3$SO$_3$Li | 3,4-dimethylphenyl-SO$_2$(CH$_2$)$_3$SO$_3$Li | 3,4-dimethylphenyl-SO$_2$(CH$_2$)$_3$SO$_3$Li | 2,3-dimethylpyridyl |

TABLE 6-continued

In the table, M, (A), (B), (C) and (D) represent constituents of the phthalocyanine compound in formula (C-a),
but the specific examples of M, (A), (B), (C) and (D) are in no particular order.
The number of each constituent represents the average value of the mixing ratio originated
in charge molar ratio of phthalonitrile derivatives used in the synthesis of the phthalocyanine.

| Compound No. | M | (A) | (B) | (C) | (D) |
|---|---|---|---|---|---|
| C-37 | Cu | dimethylphenyl-SO$_2$(CH$_2$)$_3$SO$_3$Li | dimethylphenyl-SO$_2$(CH$_2$)$_3$SO$_3$Li | dimethylphenyl-SO$_2$(CH$_2$)$_3$SO$_3$Li | methylpyridine |
| C-38 | Cu | dimethylphenyl-SO$_2$(CH$_2$)$_3$SO$_3$Li | dimethylphenyl-SO$_2$(CH$_2$)$_3$SO$_3$Li | dimethylphenyl-SO$_2$(CH$_2$)$_3$SO$_3$Li | dimethylpyrazine |
| C-39 | Cu | dimethylphenyl-SO$_2$(CH$_2$)$_3$SO$_3$Li | dimethylphenyl-SO$_2$(CH$_2$)$_3$SO$_3$Li | dimethylpyridine | dimethylpyridine |
| C-40 | Cu | dimethylphenyl-SO$_2$(CH$_2$)$_3$SO$_3$Li | dimethylphenyl-SO$_2$(CH$_2$)$_3$SO$_3$Li | trimethylpyridine | trimethylpyridine |

TABLE 7

In the table, M, (A), (B), (C) and (D) represent constituents of the phthalocyanine compound in formula (C-a),
but the specific examples of M, (A), (B), (C) and (D) are in no particular order.
The number of each constituent represents the average value of the mixing ratio originated
in charge molar ratio of phthalonitrile derivatives used in the synthesis of the phthalocyanine.

| Compound No. | M | (A) | (B) |
|---|---|---|---|
| C-41 | Cu | dimethylphenyl with two -SO$_2$(CH$_2$)$_3$SO$_3$Li groups | dimethylpyrazine |
| C-42 | Cu | dimethylphenyl-SO$_2$(CH$_2$)$_3$SO$_3$Li | dimethylphenyl-SO$_2$(CH$_2$)$_3$SO$_3$Li |

TABLE 7-continued

| Compound No. | Metal | (A) | (B) |
|---|---|---|---|
| C-43 | Cu | 2,3-dimethylphenyl-SO$_2$(CH$_2$)$_3$SO$_2$NHCH$_2$CHCH$_3$(OH) | 2,3-dimethylphenyl-SO$_2$(CH$_2$)$_3$SO$_2$NHCH$_2$CHCH$_3$(OH) |
| C-44 | Ni | 2,3-dimethylphenyl-SO$_2$NH(CH$_2$)$_2$SO$_3$Li | 2,3-dimethylphenyl-SO$_2$NH(CH$_2$)$_2$SO$_3$Li |
| C-45 | Cu | 2,3-dimethylphenyl-CONH(CH$_2$)$_2$SO$_3$Li | 2,3-dimethylphenyl-CONH(CH$_2$)$_2$SO$_3$Li |

| Compound No. | (C) | (D) |
|---|---|---|
| C-41 | 2,3-dimethylpyridine | 3,4-dimethylpyridine |
| C-42 | 2,3-dimethylphenyl-SO$_2$(CH$_2$)$_3$SO$_2$NHCH$_2$CHCH$_3$(OH) | 3-methyl-2-methylpyridine |
| C-43 | 2,3-dimethylphenyl-SO$_2$(CH$_2$)$_3$SO$_2$NHCH$_2$CHCH$_3$(OH) | 2,3-dimethylpyrazine |
| C-44 | 2,3-dimethylphenyl-SO$_2$NH(CH$_2$)$_2$SO$_3$Li | 3,4-dimethylpyridine |

TABLE 7-continued

C-45

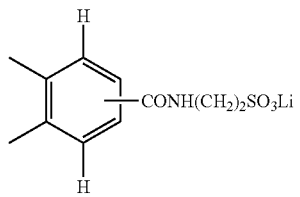 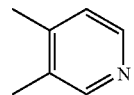

As oil-soluble cyan dyes, the following compounds are exemplified.

TABLE 8

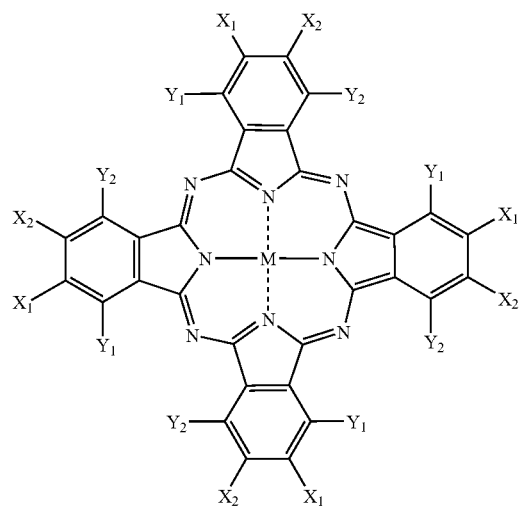

In the table, the specific examples of each group of the substituents (X1, X2), (Y1, Y2) on each benzene ring are in no particular order.

| | | | | | |
|---|---|---|---|---|---|
| P-1 | Cu | $-SO_2NHC_8H_{17}{}^{-t}$ | —H | —H | —H |
| P-2 | Cu | $-SO_2NHCH_2CH(C_2H_5)C_4H_9{}^{-n}$ | —H | —H | —H |
| P-3 | Cu | $-SO_2NH\!-\!\!\!\langle\ \rangle\!\!-\!OC_2H_4OCH_3$ ; $SO_2NHCH_2CH(C_2H_5)C_4H_9{}^{-n}$ | —H | —H | —H |
| P-4 | Cu | $-SO_2(CH_2)_3SO_2NHCH_2CH(CH_3)C_2H_5$ | —H | —H | —H |
| P-5 | Cu | $-SO_2(CH_2)_3SO_2NH(CH_2)_3OC_3H_7{}^{-iso}$ | —H | —H | —H |
| P-6 | Cu | $-SO_2(CH_2)_3CO_2CH(CH_3)CH_2OCH_3$ | —H | —H | —H |
| P-7 | Zn | $-SO_2CH_2CH(OCH_3)C$ | —CN | —H | —H |
| P-8 | Cu | $-CONHCH_2CH(C_2H_5)$ | —H | —Cl | —H |
| P-9 | Cu | $-CO_2CH(CH_3)CHOC_4H_9{}^{-t}$ | —H | —H | —H |

TABLE 9

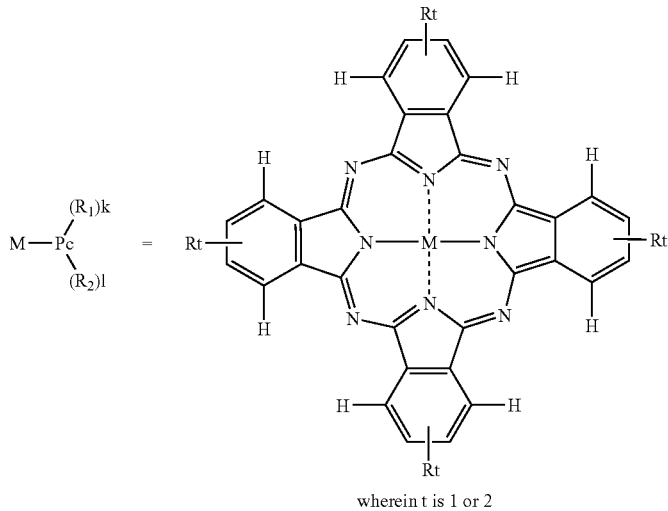

wherein t is 1 or 2

In the table, the introduction position and order of the specific examples of substituents (R1) and (R2) on the β-position are in no particular order.
The values of k and l represent the average value of the mixing ratio originated in charge molar ratio of phthalonitrile derivatives used in the synthesis of the phthalocyanine.

| Compound No. | M | R1 | k | R2 | l |
|---|---|---|---|---|---|
| P-10 | Cu | $-SO_2(CH_2)_3SO_2NHCH_2CH(OH)CH_3$ | 3 | $-SO_2(CH_2)_3SO_2NHCH_2CH(C_2H_5)C_4H_9^{-n}$ | 1 |
| P-11 | Cu | $-SO_2(CH_2)_2O(CH_2)_2O(CH_2)_2OH$ | 3 | $-SO_2(CH_2)_3CO_2CH_2CH(C_2H_5)C_4H_9^{-n}$ | 1 |
| P-12 | Cu | $-SO_2CH_2CH(C_2H_5)C_4H_9^{-n}$ | 2 | $-SO_2(CH_2)_3SO_2NHCH_2CH(OCH_3)CH_3$ | 2 |
| P-13 | Cu | $-SO_2(CH_2)_3SO_2NHCH_2CH(OCH_3)CH_3$ | 3 | $-SO_2NH(CH_2)_2SO_2NH(CH_2)_2O(CH_2)_2OH$ | 1 |
| P-14 | Cu | $-SO_2(CH_2)_3SO_2NHCH_2CH(OH)CH_3$ | 2.5 | $-SO_2(CH_2)_3CONHCH(CH_3)C_2H_5$ | 1.5 |
| P-15 | Cu | $-SO_2(CH_2)_3CO_2CH(CH_3)C_2H_5$ | 2 | $-SO_2(CH_2)_3SO_2NH(CH_2)_3OC_3H_7^{-iso}$ | 2 |
| P-16 | Cu | $-SO_2(CH_2)_3SO_2NHCH_2CH(OH)CH_3$ | 3 | $-SO_2(CH_2)_2O(CH_2)_2O(CH_2)_2OCH_3$ | 1 |
| P-17 | Cu | $-SO_2(CH_2)_3SO_2NHC_3H_7^{-iso}$ | 3 | $-CO_2CH_2CH(C_2H_5)C_4H_9^{-n}$ | 1 |
| P-18 | Cu | $-CONH(CH_2)_2SO_2NHC_3H_7^{-iso}$ | 3 | $-SO_2NHCH_2CH(C_2H_5)C_4H_9^{-n}$ | 1 |

TABLE 10

In the table, M, (A), (B), (C) and (D) represent constituents of the phthalocyanine compound in formula (C-a), but the specific examples of M, (A), (B), (C) and (D) are in no particular order.
The number of each constituent represents the average value of the mixing ratio originated in charge molar ratio of phthalonitrile derivatives used in the synthesis of the phthalocyanine.

| Compound No. | M | (A) | (B) |
|---|---|---|---|
| P-19 | Cu | ![dimethylphenyl]–SO₂(CH₂)₃SO₂NH(CH₂)₃OC₃H₇⁻ⁱˢᵒ | ![dimethylphenyl]–SO₂(CH₂)₃SO₂NH(CH₂)₃OC₃H₇⁻ⁱˢᵒ |
| P-20 | Cu | ![dimethylphenyl]–SO₂(CH₂)₃SO₂NH(CH₂)₃OC₃H₇⁻ⁱˢᵒ | ![dimethylphenyl]–SO₂(CH₂)₃SO₂NH(CH₂)₃OC₃H₇⁻ⁱˢᵒ |

TABLE 10-continued

| | | | |
|---|---|---|---|
| P-21 | Cu | 2,3-dimethylphenyl-SO$_2$(CH$_2$)$_3$SO$_2$NH(CH$_2$)$_3$OC$_3$H$_7$-iso | 2,3-dimethylphenyl-SO$_2$(CH$_2$)$_3$SO$_2$NH(CH$_2$)$_3$OC$_3$H$_7$-iso |
| P-22 | Cu | 2,3-dimethylphenyl-SO$_2$(CH$_2$)$_3$CO$_2$CH(CH$_3$)CH$_2$OCH$_3$ | (CH$_3$)$_2$C=C(CH$_3$)-SO$_2$(CH$_2$)$_3$CO$_2$CH(CH$_3$)CH$_2$OCH$_3$ |

| Compound No. | (C) | (D) |
|---|---|---|
| P-19 | 2,3-dimethylphenyl-SO$_2$(CH$_2$)$_3$SO$_2$NH(CH$_2$)$_3$OC$_3$H$_7$-iso | 3-methylpyridin-2-yl |
| P-20 | 2,3-dimethylphenyl-SO$_2$(CH$_2$)$_3$SO$_2$NH(CH$_2$)$_3$OC$_3$H$_7$-iso | 4-methylpyridin-3-yl |
| P-21 | 2,3-dimethylphenyl-SO$_2$(CH$_2$)$_3$SO$_2$NH(CH$_2$)$_3$OC$_3$H$_7$-iso | 3-methylpyrazin-2-yl |
| P-22 | 2,3-dimethylpyrazin-2-yl | 2,3-dimethylpyrazin-2-yl |

Besides the above exemplified compounds, the compounds disclosed in WO 2002/60994, WO 2003/00811, WO 2003/62324, WO 2004/87815, WO 2004/85541, JP-A-2003-213167, JP-A-2004-075986, JP-A-2004-323605, JP-A-2004-315758 and Japanese Patent Application No. 2003-421124 can also be used as preferred compounds. Compound (C) can be synthesized according to the methods disclosed in JP-A-2004-315729, Japanese Patent Application Nos. 2003-411390, 2004-094413 and 2003-114155 in addition to the above patents. Incidentally, starting materials, dye intermediates and synthesis routes are not restricted thereto.

Compound (C) can be used alone, but can be used in combination with other dyes or pigments, in particular, can be used in combination with other phthalocyanine dyes.

When used in combination with other dyes, it is preferred that the total content of other dyes is from 0.1 to 30 mass parts in 100 mass parts of the entire dyes, more preferably from 0.2 to 20 mass parts, and still more preferably from 0.5 to 15 mass parts.

Further, the oxidation potential of the dyes for the invention is preferably nobler than 1.0 V (vs SCE), more preferably nobler than 1.1 V (vs SCE), and especially preferably nobler than 1.15 V (vs SCE).

The value of oxidation potential (Eox) can be easily measured by those who in the art. The measuring methods of oxidation potential are described, e.g., in P. Delahay, *New Instrumental Methods in Electrochemistry*, Interscience Publishers (1954), A. J. Bard et al., *Electrochemical Methods*, John Wiley & Sons (1980), and Akira Fujishima et al., *Denki Kagaku Sokuteiho* (*Electrochemical Measuring Methods*), Gihodo Publishing Co. (1984).

Specifically, oxidation potential is measured as the value to SCE (a saturated calomel electrode) with various voltammetries (polarography using a dropping mercury electrode, cyclic voltammetry, and a method of using a rotated disc electrode) by dissolving $1 \times 10^{-2}$ to $1 \times 10^{-6}$ mol/liter of a test sample in a solvent, e.g., dimethylformamide or acetonitrile containing a supporting electrolyte, e.g., sodium perchlorate or tetrapropylammonium perchlorate. There are cases where the value deviates several 10 mV or so by the influence of liquid potential difference and the liquid resistance of a sample solution, but the reproducibility of potential can be compensated for by the addition of a standard sample (e.g., hydroquinone).

Incidentally, in the invention, the value (vs SCE) obtained by the measurement in N,N-dimethylformamide containing 0.1 mol/liter of tetrapropylammonium perchlorate as supporting electrolyte (the concentration of the dye is 0.001 mol/liter), using SCE (a saturated calomel electrode) as the reference electrode, a graphite electrode as the working electrode, and a platinum electrode as the counter electrode, was taken as the oxidation potential of the dye.

The value of Eox shows the easiness of transfer of an electron from a sample to an electrode, and the greater the value (oxidation potential is nobler), the harder is the transfer of an electron from a sample to an electrode, in other words, difficult to be oxidized. In relation to the structure of a compound, oxidation potential becomes nobler by the introduction of an electron attractive group and becomes baser by the introduction of an electron donating group. In the invention, it is preferred to make oxidation potential nobler by substituting the carbon atoms of the phthalocyanine skeleton of a compound represented by formula (C) partially with hetero atoms, or by introducing an electron attractive group into a phthalocyanine skeleton to lower the reactivity with ozone which is an electrophilic agent.

It is preferred that the dyes for the invention has $\epsilon 1/\epsilon 2$, according to the aggregation property evaluating method described below, of preferably 1.05 or more, more preferably from 1.1 to 2.0, and especially preferably from 1.2 to 1.5.

(Evaluating Method of Aggregation Property of Dye)

The aggregation property of a dye can be evaluated as follows. The ratio of the molecular extinction coefficient of solution absorption spectrum ($\epsilon 1$) of the time when 0.01 mmol/liter of a dye solution is measured with a cell of optical path length of 1 cm to the molecular extinction coefficient of solution absorption spectrum ($\epsilon 2$) of the time when 20 mmol/liter of a dye solution is measured with a cell of optical path length of 5 µm, $\epsilon 1/\epsilon 2$, is the index of the aggregation property of the dye. The greater the numerical value, the easier is the aggregation of the dye. Dyes having the value of 1.05 or more show properties excellent in ozone resistance and light fastness due to the aggregation of dye.

In the above measurement, as the solvent for use in a dye solution, super pure water having a specific resistance value of 18 MΩ•cm or more such as deionized water is used when a dye is water-soluble, and when a dye is oil-soluble, an organic solvent capable of dissolving a dye is used to make a homogeneous solution, or dispersed in super pure water similar to the case of the water-soluble dye, or measurement is performed as an emulsion.

Besides dyes and planar compounds, the ink stock solution and/or the ink composition in the invention can contain other components, e.g., surfactants and water-miscible organic solvents as described above.

Surfactants can provide excellent effects such as the improvement of ejection stability of ink, the improvement of waterproofing property of an image, and the prevention of blotting of printed ink by adjusting the physical properties of an ink solution.

As surfactants, anionic surfactants, e.g., betaine compounds, sodium dodecylbenzenesulfonate, sodium dodecyloxysulfonate, and sodium alkylbenzenesulfonate, cationic surfactants, e.g., cetylpyridinium chloride, trimethylcetylammonium chloride, and tetrabutylammonium chloride, and nonionic surfactants, e.g., polyoxyethylene nonyl phenyl ether, polyoxyethylene naphthyl ether, and polyoxyethylene octyl phenyl ether are exemplified. Of these surfactants, nonionic surfactants and betaine compounds are preferably used.

The content of surfactants is from 0.001 to 15 mass % to the ink composition of the invention, preferably from 0.005 to 10 mass %, and still more preferably from 0.01 to 5 mass %.

The examples of water-miscible organic solvents usable in the invention include alcohols (e.g., methanol, ethanol, propanol, isopropanol, butanol, isobutanol, sec-butanol, t-butanol, pentanol, hexanol, cyclohexanol, benzyl alcohol), polyhydric alcohols (e.g., ethylene glycol, diethylene glycol, triethylene glycol, polyethylene glycol, propylene glycol, dipropylene glycol, polypropylene glycol, butylene glycol, hexanediol, pentanediol, glycerin, hexanetriol, thio-diglycol), glycol derivatives (e.g., ethylene glycol monomethyl ether, ethylene glycol monoethyl ether, ethylene glycol monobutyl ether, diethylene glycol monomethyl ether, diethylene glycol monobutyl ether, propylene glycol mono-methyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether, triethylene glycol monoethyl ether, ethylene glycol monophenyl ether), amine (e.g., ethanolamine, diethanolamine, triethanolamine, N-methyldiethanolamine, N-ethyldiethanolamine, morpholine, N-ethylmorpholine, ethylenediamine, diethylenetriamine, triethylenetetramine, polyethyleneimine, tetramethyl-propylenediamine), and other polar solvents (e.g., formamide, N,N-dimethylformamide, N,N-dimethylacetamide, dimethyl sulfoxide, sulforan, 2-pyrrolidone, N-methyl-2-pyrrolidone, N-vinyl-2-pyrdrolidone, 2-oxazolidone, 1,3-dimethyl-2-imidazolidinone, acetonitrile, acetone) are exemplified. Two or more water-miscible organic solvents may be used in combination.

In addition to the above components, the invention can contain one or more additives selected from the group consisting of a blotting preventing agent, a defoaming agent, a bronzing inhibitor, a chelating agent, a drying inhibitor (a lubricant), a penetration accelerator, an ultraviolet absorber, an antioxidant, a viscosity adjustor, a dispersant, and a rust preventive. The invention can contain these additives by appropriately selecting in appropriate amounts. The above-described components and these additives may have one or two or more functions per one compound. Accordingly, in the blending ratios of these additives, when one compound has two or more functions, the compound is included in each functional component independently.

The invention can be used in various image recording for high image durability.

As dyes for imaging, various uses and applications can be possible, e.g., use for photosensitive photographic materials, use for heat transfer materials, use for heat-sensitive and pressure-sensitive recording materials, and use for ink jet recording are exemplified, and use for ink jet recording is especially preferred.

Ink compositions of yellow, magenta, cyan and black capable of obtaining from ink stock solutions prepared by arbitrarily selecting dyes can constitute an ink set for obtaining full color images. Alternatively, the ink compositions can consist of a part of an ink set. That is, for constituting an ink set, the ink composition in the invention may be combined with other arbitrary ink compositions.

As the dyes usable in the ink set in the invention, optional dyes can be used and, for example, the dyes disclosed in JP-A-2003-306623, paragraphs from 0090 to 0092, can be used.

(Recording Method)

The recording methods using the ink composition or the ink set of the invention are not restricted, but it is preferred to use for an ink jet recording method.

According to the ink jet recording method in the invention, an energy is given to the ink composition and images are formed on well-known image-receiving materials, that is, plain paper, resin coated paper, ink jet paper disclosed, e.g., in JP-A-8-169172, JP-A-8-27693, JP-A-2-276670, JP-A-7-276789, JP-A-9-323475, JP-A-62-238783, JP-A-10-153989, JP-A-10-217473, JP-A-10-235995, JP-A-10-337947, JP-A-10-217597 and JP-A-10-337947, film, electrophotographic paper, napkin, glass, metal and ceramics. As the image-receiving materials, image-receiving materials comprising a support having provided thereon an ink-receiving layer containing white inorganic pigment particles are preferred. The ink jet recording methods disclosed in JP-A-2003-306623, paragraphs from 0093 to 0105, can be applied to the invention.

In forming images, a polymer latex compound can be used in combination for the purpose of providing glossiness and water tightness, and improving weather fastness. A latex compound may be added to an image-receiving material any time and anywhere, e.g., before, after, or simultaneously with the addition of colorants, and to image-receiving paper or to ink or, alternatively a latex compound may be used as an independent liquid substance. Specifically, the methods disclosed in JP-A-2002-166638, JP-A-2002-121440, JP-A-2002-154201, JP-A-2002-144696, JP-A-2002-080759, Japanese Patent Application Nos. 2000-299465 and 2000-297365, can be preferably used.

Polymer latexes may be added to ink jet recording paper and the constitutional layers of a recording film (including a back coat layer). Polymer latexes are used for the purpose of the improvement of physical properties, such as dimensional stability, curling inhibition, adhesion prevention and cracking prevention of a film. Polymer latexes are disclosed in JP-A-62-245258, JP-A-62-1316648 and JP-A-62-110066. By the addition of polymer latexes having a low glass transition temperature (40° C. or less) to the layer containing a mordant, cracking of the layer and curling can be prevented. Further, curling can also be prevented by the addition of polymer latexes having a high glass transition temperature to a back coat layer.

As described above, the ink composition of the invention may be used in ink sets for forming color images. The ink composition or ink set in the invention is used irrespective of ink jet recording system. That is, the ink composition or ink set in the invention is used in well-known recording systems, e.g., a charge control system of ejecting ink by utilizing electrostatic induction force, a drop on demand system (a pressure pulse system) utilizing vibratory pressure of piezo elements, an acoustic ink jet system of converting electric signal to acoustic beam to irradiate ink and ejecting ink by utilizing radiation pressure, and a thermal ink jet system of heating ink to form foams and utilizing the formed pressure.

Ink jet recording system includes a system of ejecting a great number of ink droplets minute in volume of ink low in density called photo-ink, a system of improving image quality with a plurality of inks having substantially the same hue and different densities, and a system of using colorless and transparent ink.

The invention will be described with reference to Examples, but the invention is not limited thereto.

EXAMPLE 1

(Manufacture of Ink Stock Solution A)

Super pure water (18 MΩ or more) (830 g) was added to 150 g of exemplified cyan dye (C-18), and the mixture was stirred at 65 to 70° C. for 1 hour. After the dye was completely dissolved, the temperature of the reaction mixture was lowered to room temperature, and 1.0 g of an antiseptic, PROXEL XL2 (manufactured by Avecia K.K.) was added thereto. After stirring for 10 minutes, the pH of the mixture was adjusted to 8.3 by the addition of potassium bicarbonate. After that, 20 g of the exemplified planar compound (P-3) was added, followed by stirring for 10 minutes, and then the reaction solution was filtered under reduced pressure with a micro filter having an average pore diameter of 0.2 μm, whereby ink stock solution A for ink jet recording was prepared.

(Manufacture of Ink Stock Solution B)

Ink stock solution B for ink jet recording was prepared in the same manner as in Example 1, except that the addition amount of the planar compound was changed to 5 mass %.

(Manufacture of Ink Stock Solutions C to E)

Ink stock solutions C to E for ink jet recording were prepared in the same manner as in Example 1, except that respective compounds shown in Table 11 below were used in place of planar compound (P-3).

(Manufacture of Ink Stock Solution F)

Ink stock solution F for ink jet recording was prepared in the same manner as in Example 1, except that super pure water was used in place of planar compound (P-3).

The viscosity of each ink stock solution obtained was measured as follows. The results obtained are shown in Table 11.

(Measurement of Viscosity)

The viscosity of 4 ml of an ink stock solution was measured at 23° C. 50% RH with a vibration viscometer VM-1G (manufactured by Yamaichi Electronics Co., Ltd.).

TABLE 11

|  | Ink Stock Solution | Planar Compound | Addition Amount of Planar Compound (mass %) | Coefficient of Viscosity (mPa · s) |
|---|---|---|---|---|
| Invention | A | P-3 | 2 | 3.5 |
| Invention | B | P-3 | 5 | 3.6 |
| Invention | C | P-2 | 2 | 4.1 |
| Invention | D | P-4 | 2 | 4.0 |
| Invention | E | P-5 | 2 | 3.9 |
| Comparison | F | None | — | 147 |

From the results shown in Table 11, it can be seen that the ink stock solutions for ink jet recording of the invention are great in the reducing effect of viscosity by planar compounds, and excellent in handling property. Further, when the planar compound is used in the ink stock solution for ink jet recording, the ink composition for ink jet recording can be manufactured without any problem.

EXAMPLE 2

(Manufacture of Light Cyan Ink G for Ink Jet Recording)

| | |
|---|---|
| Dye (C-18) | 1.7 g |
| Triethylene glycol monobutyl ether | 10.0 g |
| Glycerin | 10.0 g |
| Triethylene glycol | 4.0 g |
| 1,2-Hexanediol | 3.4 g |
| Surfynol 465 (surfactant, manufactured by Air Products and Chemicals, Inc.) | 1.0 g |
| Triethanolamine | 0.3 g |
| Urea | 2.5 g |
| Super pure water to make | 100 g |

The above components were stirred at 60 to 65° C. for 1 hour while heating. After the dye was completely dissolved, the reaction solution was cooled to room temperature, and then the solution was filtered under reduced pressure with a micro filter having an average pore diameter of 0.2 μm, whereby ink stock solution G for ink jet recording was prepared.

The viscosity of ink stock solution G measured according to the above method was 4.6 mPa·s.

(Manufacture of Light Cyan Ink H for Ink Jet Recording)

Light cyan ink H for ink jet recording was manufactured in the same manner as the manufacture of light cyan ink G, except that 11.3 g of ink stock solution A was used in place of dye (C-18). The viscosity of ink stock solution H measured according to the above method was 4.5 mPa·s.

(Manufacture of Printed Sample)

The above light cyan ink G and H were respectively filled in light cyan ink cartridges of ink jet printer PM-G800 (manufactured by SEIKO EPSON CORPORATION), and images were printed on ink jet photographic paper (glossy paper, manufactured by SEIKO EPSON CORPORATION) with the same printer. Evaluation of the printed images was performed as follows. Further, light cyan ink cartridge of PM-G800 was used for comparison.

(Printing Performance)

After the cartridges were set on the printer and ejection of inks from all the nozzles was observed, 50 sheets of A4 size paper were outputted, and the disturbance of printed letters was evaluated. The test was performed just after filling ink and after allowing the cartridges to stand at 60° C. for 10 days.

A: The disturbance of printed letters did not occur at all from the beginning until termination of printing.

B: The output having the disturbance of printed letters occurred.

C: The disturbance of printed letters occurred throughout printing.

(Results)

All of light cyan ink H using the ink stock solution for ink jet recording of the invention, comparative light cyan ink G and PM-G800 showed good printing performance in the tests of just after being set and after standing for 10 days, and graded A.

From the above results, it can be seen that the ink composition can be manufactured with the stock solution of the invention with no problem. The present application claims foreign priority based on Japanese Patent Application No. JP 2005-069772, filed Mar. 11 of 2005, the contents of which is incorporated herein by reference.

What is claimed is:

1. An ink stock solution comprising at least a dye and a colorless planar compound having more than ten delocalization π electrons in one molecule, wherein the concentration of the dye in the ink stock solution is more than 10 mass % and not more than 50 mass %.

2. The ink stock solution as claimed in claim 1, wherein the dye is a compound represented by formula (C):

Formula (C)

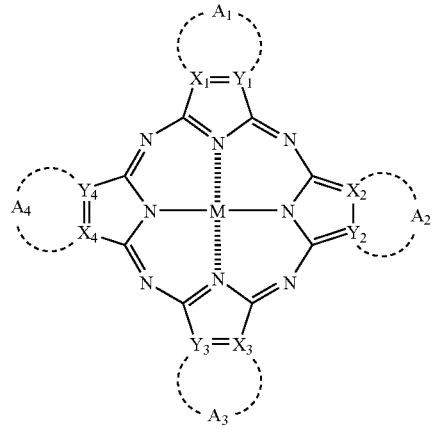

wherein $X_1, X_2, X_3, X_4, Y_1, Y_2, Y_3$ and $Y_4$ each independently represents a carbon atom or a nitrogen atom; $A_1$ represents an atomic group necessary to form an aromatic ring or a heterocyclic ring together with $X_1$ and $Y_1$, $A_2$ represents an atomic group necessary to form an aromatic ring or a heterocyclic ring together with $X_2$ and $Y_2$, $A_3$ represents an atomic group necessary to form an aromatic ring or a heterocyclic ring together with $X_3$ and $Y_3$, $A_4$ represents an atomic group necessary to form an aromatic ring or a heterocyclic ring together with $X_4$ and $Y_4$, each of $A_1$ to $A_4$ may have a substituent, at least one of $A_1$ to $A_4$, or at least one of the substituents of $A_1$ to $A_4$ has a substituent for imparting solubility; and M represents a hydrogen atom, a metallic element, a metallic oxide, a metallic hydroxide, or a metal halide.

3. The ink stock solution as claimed in claim 2, wherein the compound represented by formula (C) is represented by formula (C-d):

Formula (C-d)

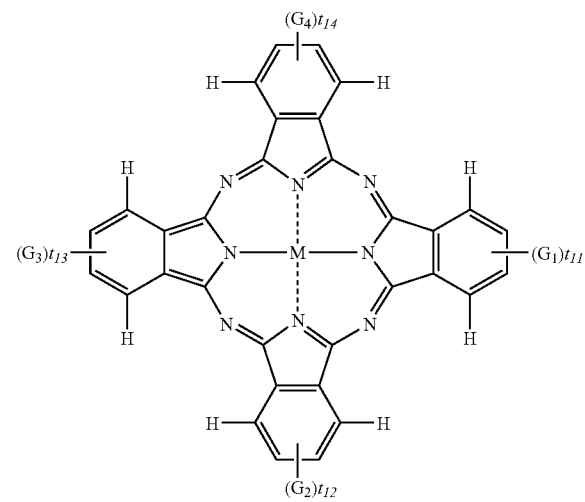

wherein $G_1$ represents —SO-Z, —$SO_2$-Z, —$SO_2NV_1V_2$, —$CONV_1V_2$, —$CO_2Z$, —COZ, or a sulfo group, $G_2$ represents —SO-Z, —$SO_2$-Z, —$SO_2NV_1V_2$, —$CONV_1V_2$, —$CO_2Z$, —COZ, or a sulfo group, $G_3$ represents —SO-Z, —$SO_2$-Z, —$SO_2NV_1V_2$, —$CONV_1V_2$, —$CO_2Z$, —COZ, or a sulfo group, and $G_4$ represents —SO-Z, —$SO_2$-Z, —$SO_2NV_1V_2$, —$CONV_1V_2$, —$CO_2Z$, —COZ, or a sulfo group, Z, which is the same or different, each represents an alkyl group, a cycloalkyl group, an alkenyl group, an alkynyl group, an aralkyl group, an aryl group, or a heterocyclic group; $V_1$ and $V_2$, which is the same or different, each represents a hydrogen atom, an alkyl group, a cycloalkyl group, an alkenyl group, an alkynyl group, an aralkyl group, an aryl group, or a heterocyclic group; M has the same meaning as M in formula (C); and $t_{11}$, $t_{12}$, $t_{13}$ and $t_{14}$ each represents 1 or 2.

4. The ink stock solution as claimed in claim 1, wherein the planar compound is represented by formula (1):

$$A_{10}\text{-}X_{10}\text{-}L_{10}\text{-}(Y_{10}\text{—}B_{10}) \tag{1}$$

wherein $A_{10}$, $L_{10}$, $B_{10}$ each independently represents an aromatic group, which is a monocyclic ring or a condensed ring; $X_{10}$ and $Y_{10}$ each independently represents a divalent linking group; n represents 0 or 1; provided that the compound represented by formula (1) contains at least one ionic hydrophilic group selected from a sulfo group, a carboxyl group, a phenolic hydroxyl group, and a phosphono group.

5. The ink stock solution as claimed in claim 1, which has a content of the planar compound of from 0.1 to 10 mass%.

6. The ink stock solution as claimed in claim 1, which has a coefficient of viscosity of from 1 to 10 mPa·s.

7. The ink stock solution as claimed in claim 1, which contains an antiseptic.

8. The ink stock solution as claimed in claim 1, which contains a pH adjustor.

9. An ink composition manufactured with the ink stock solution as described in claim 1.

10. The ink stock solution as claimed in claim 1, wherein $X_{10}$ and $Y_{10}$ each independently represents a divalent group selected from the group consisting of an alkylene group, an alkenylene group, —CO—, —$SO_m$, —NR—, —O—, or a divalent group combining these linking groups, wherein m represents 0, 1 or 2; and R represents a hydrogen atom, an alkyl group, an aryl group, or a heterocyclic group.

* * * * *

UNITED STATES PATENT AND TRADEMARK OFFICE
CERTIFICATE OF CORRECTION

PATENT NO. : 7,404,850 B2
APPLICATION NO. : 11/372114
DATED : July 29, 2008
INVENTOR(S) : Takashi Ozawa and Yoshiharu Yabuki It is certified that error appears in the above-identified patent and that said Letters Patent is hereby corrected as shown below:

In column 55, line 19 should read:
$$A_{10}\text{-}X_{10}\text{-}L_{10}\text{-}(Y_{10}\text{-}B_{10})_{\underline{n}} \qquad (1)$$

Signed and Sealed this

Sixteenth Day of December, 2008

JON W. DUDAS
*Director of the United States Patent and Trademark Office*